United States Patent
Alix et al.

(10) Patent No.: US 12,510,336 B1
(45) Date of Patent: Dec. 30, 2025

(54) SQUIB ENABLED HOLD UP BATTERY SWITCH

(71) Applicant: BAE Systems Information and Electronic Systems Integration Inc., Nashua, NH (US)

(72) Inventors: Christopher Alix, Barrington, NH (US); Jeffrey A. Gensler, Austin, TX (US); Ross T. Johnson, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 176 days.

(21) Appl. No.: 18/364,522

(22) Filed: Aug. 3, 2023

(51) Int. Cl.
*F42B 5/15* (2006.01)
*H02J 7/00* (2006.01)

(52) U.S. Cl.
CPC .............. *F42B 5/15* (2013.01); *H02J 7/0031* (2013.01)

(58) Field of Classification Search
CPC ............ F42B 5/145; F42B 5/15; H02J 7/0031
See application file for complete search history.

(56) References Cited

U.S. PATENT DOCUMENTS

| | | | |
|---|---|---|---|
| 4,313,379 A | 2/1982 | Wallace | |
| 5,411,225 A | 5/1995 | Lannon et al. | |
| 6,983,385 B2 | 1/2006 | German et al. | |
| 7,091,693 B2 | 8/2006 | Grunert et al. | |
| 7,158,843 B2 | 1/2007 | Smith | |
| 7,278,658 B2 | 10/2007 | Boucher et al. | |
| 7,299,427 B2 | 11/2007 | Settles | |
| 7,343,859 B2 | 3/2008 | Matsuda et al. | |
| 8,154,255 B2 | 4/2012 | Wang et al. | |
| 9,003,944 B2 * | 4/2015 | Zatterqvist | B64D 7/00 89/1.51 |
| 9,689,928 B2 | 6/2017 | Bernardon | |
| 9,811,079 B2 | 11/2017 | Theiss | |
| 9,870,333 B1 | 1/2018 | Lam et al. | |
| 9,995,793 B2 | 6/2018 | Bernardon | |
| 10,140,238 B2 | 11/2018 | Mundt et al. | |
| 10,211,488 B2 | 2/2019 | Willgert et al. | |
| 10,409,756 B2 | 9/2019 | Zhao et al. | |
| 10,611,330 B2 | 4/2020 | Phillion et al. | |
| 10,697,742 B2 | 6/2020 | Dube et al. | |
| 12,235,061 B1 * | 2/2025 | Kohl | F42B 5/15 |

(Continued)

FOREIGN PATENT DOCUMENTS

| | | |
|---|---|---|
| GB | 2480354 | 11/2011 |
| GB | 2504632 | 2/2014 |

(Continued)

*Primary Examiner* — Thienvu V Tran
*Assistant Examiner* — Christopher J Clark
(74) *Attorney, Agent, or Firm* — Sand, Sebolt & Wernow LPA; Gary McFaline

(57) ABSTRACT

A countermeasure includes a cartridge case. There is an impulse cartridge (IC) cup on the cartridge case. There is a deployable payload within the cartridge case, where the deployable payload is adapted to be deployed and expelled from the cartridge case. A battery is on the deployable payload, wherein the battery is enabled to power a component on the deployable payload in response to an impulse cartridge being connected with the IC cup and the battery is disabled in response to the impulse cartridge being disconnected from the IC cup.

15 Claims, 20 Drawing Sheets

(56) References Cited

U.S. PATENT DOCUMENTS

| | | |
|---|---|---|
| 12,253,342 B1 * | 3/2025 | Gensler .................. F41F 3/06 |
| 2004/0064744 A1 | 4/2004 | German et al. |
| 2012/0210900 A1 * | 8/2012 | Kramer ................ F42C 19/06 |
| | | 102/370 |
| 2014/0242420 A1 | 8/2014 | Schaffner et al. |
| 2017/0327068 A1 * | 11/2017 | Phillion ........... G06K 19/07703 |
| 2021/0404783 A1 | 12/2021 | Branch et al. |
| 2022/0397360 A1 | 12/2022 | Plemons et al. |

FOREIGN PATENT DOCUMENTS

| | | |
|---|---|---|
| GB | 2520810 | 6/2015 |
| WO | 2011010163 | 1/2011 |
| WO | 2011101692 | 8/2011 |
| WO | 2021262984 | 12/2021 |
| WO | 2023014569 | 2/2023 |

\* cited by examiner

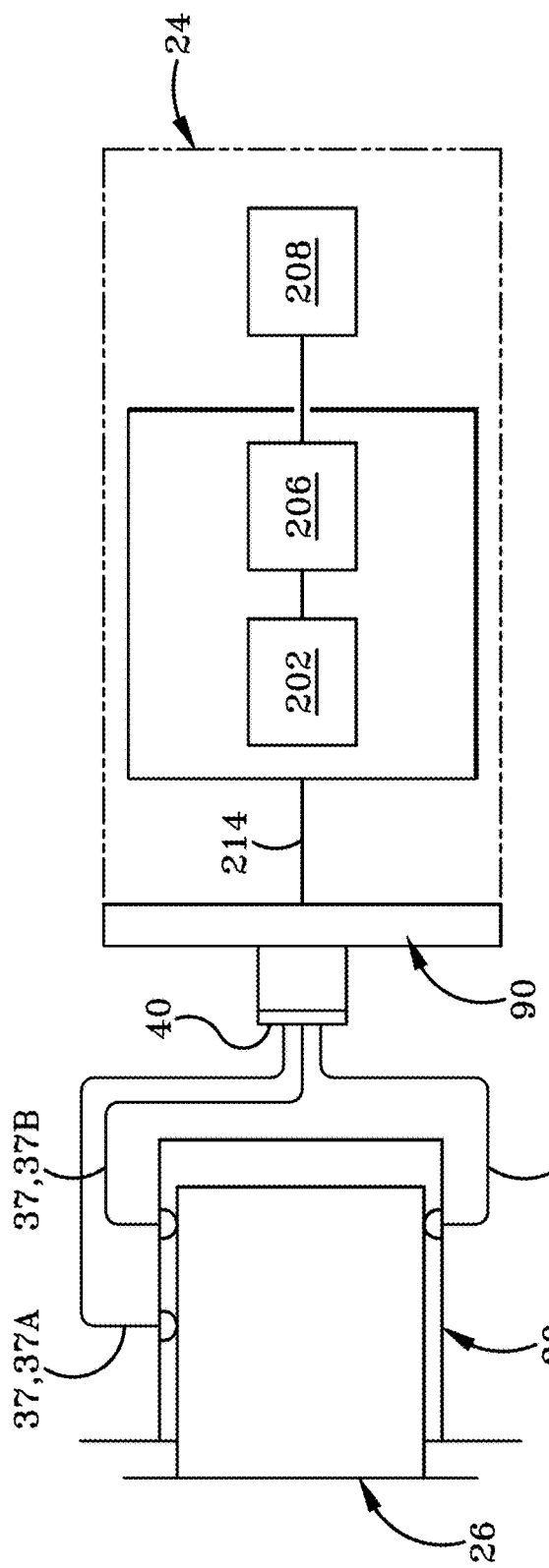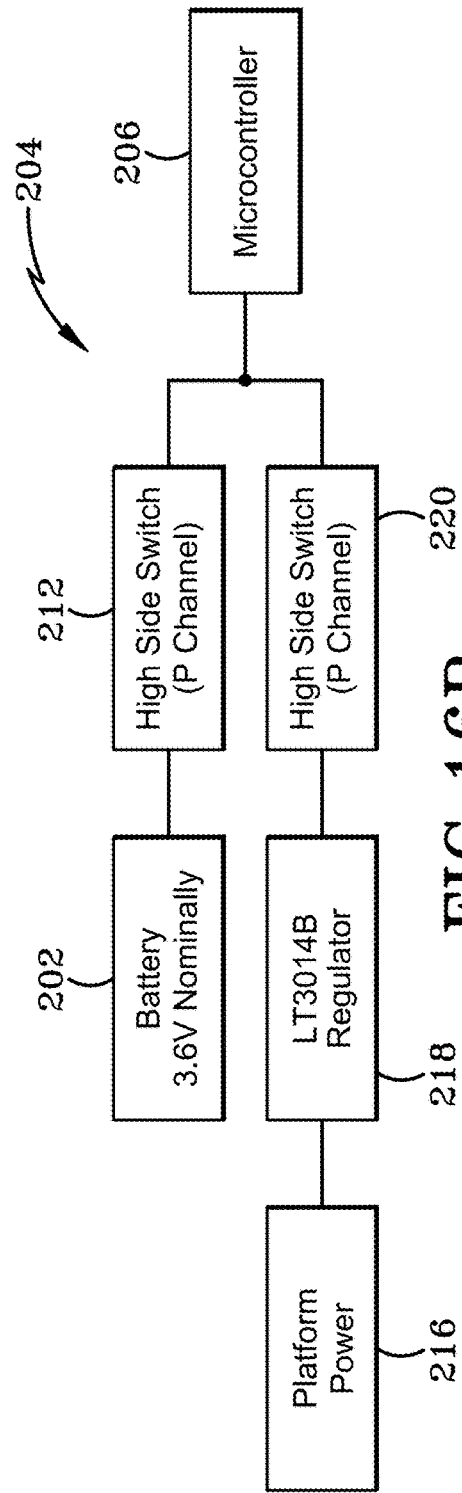
FIG.16A
FIG.16B

SQUIB ENABLED HOLD UP BATTERY SWITCH

STATEMENT OF GOVERNMENT INTEREST

This invention was made with government support under Prime Contract No. 14 D 0423/21 F 0005 awarded by a classified federal agency. The government has certain rights in the invention.

RELATED APPLICATIONS

Initially, it is noted that the present disclosure is related to the below listed U.S. Patent applications ("the Incorporated Applications"), filed on equal date herewith, the entirety of each of which is incorporated herein as if fully rewritten. The Incorporated Applications are:
1. U.S. patent application Ser. No. 18/364,508, entitled "IMPULSE CARTRIDGE CUP FOR SMART STORES COMMUNICATION INTERFACE SQUIB WITH ELECTRONICS";
2. U.S. patent application Ser. No. 18/364,514, entitled "COUNTERMEASURE EXPENDABLE HAVING A REMOVABLE PORT PLUG AND COUNTERMEASURE DISPENSER SYSTEM IMPLEMENTING THE SAME";
3. U.S. patent application Ser. No. 18/364,516, entitled "SMART PISTON";
4. U.S. patent application Ser. No. 18/364,527, entitled "MODULAR COMMON CONTROL CARD"; and
5. U.S. patent application Ser. No. 18/364,528, entitled "SMART STORE COMMUNICATION INTERFACE (SSCI) COMPATIBLE SQUIB DESIGN".

Since the present disclosure is related to the Incorporated Applications, some similar structural nomenclature is used herein when referencing some portions of the present disclosure relative to the Incorporated Applications. However, there may be some instances where structural nomenclature differs between similar elements and there may be other instances where nomenclature is similar between distinct elements relative to the present disclosure and the Incorporated Applications.

TECHNICAL FIELD

The present disclosure relates to smart technology provided inside of a countermeasure expendable for a countermeasure dispensing system (CMDS).

BACKGROUND ART

In current military technologies, military platforms, such as a military aircraft, include at least one countermeasure dispensing system (CMDS). The CMDS may eject one or more countermeasure expendables from the platform to dispense chaff material or flares away from the platform to counter a detected incoming threat, such as missiles or similar ballistic threats. Such dispensing of chaff material or flares away from the platform may then redirect the incoming threat away from the platform to leave the platform unscathed and/or unharmed. Each countermeasure dispenser in a CMDS is also electrically connected to a sequencer unit for ejecting the countermeasure expendables from the military platform. However, upon dispensing, these countermeasure expendables must dispense at suitable distances away from the military platform to ensure the incoming threat does not damage or destroy the military platform upon detonation of the incoming threat.

To combat these issues, conventional countermeasure expendables may include various technologies to ensure the countermeasure materials are dispensed at suitable distances away from the military platform to ensure the incoming threat does not damage or destroy the military platform upon detonation of the incoming threat. However, such countermeasure expendables use archaic and/or mechanical time delay devices (i.e., fuses and other similar time delays of the like) to ensure the countermeasure materials are dispensed at suitable distances away from the military platform. With such technology, testing and/or updating these countermeasure expendables may require extensive field testing that results in extensive labor and experimental costs. Further, the batteries that are on these countermeasure expendables are subject to depletion during storage and may be difficult to activate.

SUMMARY OF THE INVENTION

In one aspect, an exemplary embodiment of the present disclosure may provide a countermeasure device comprising: a cartridge case or canister; a deployable payload within the canister, where the deployable payload is adapted to be deployed and expelled from the canister; a battery in the canister; a switch in the canister that is electrically connected to battery, wherein the switch is configured to be repeatedly switched between an active state and an inactive state based on two different actions, wherein the active state permits transmission of power from the battery through the switch and the inactive state precludes transmission of power from the battery through the switch. This exemplary embodiment or another exemplary embodiment may further provide that the two different actions includes: a first action to effect the switch to operate in a first manner; and a second action to effect the switch to operate in a second manner. This exemplary embodiment or another exemplary embodiment may further provide that the first action effects the switch to permit transmission of power through the switch and the second action effects the switch to preclude transmission of power through the switch. This exemplary embodiment or another exemplary embodiment may further provide that the first action is associated with connecting a device to the canister and the second action is associated with the disconnecting the device from the canister. This exemplary embodiment or another exemplary embodiment may further provide that the first action is associated with connecting an impulse cartridge or squib to a portion of the canister and the second action is associated with disconnecting the impulse cartridge or squib from the canister. This exemplary embodiment or another exemplary embodiment may further provide that the first action is associated with a completed electrical current path and the second action is associated with an incomplete electrical current path. This exemplary embodiment or another exemplary embodiment may further provide an impulse cartridge (IC) cup on the canister, wherein insertion of an impulse cartridge or squib into the IC cup establishes the completed electrical current path associated with the first action to permit transmission of power through the switch and the absence of the impulse cartridge or squib from the IC cup establishes the incomplete current path.

In yet another aspect, an exemplary embodiment of the present disclosure may provide a countermeasure device comprising: a canister or cartridge case; an IC cup on the cartridge case; a deployable payload within the cartridge case, where the deployable payload is adapted to be deployed and expelled from the cartridge case; and a battery on the deployable payload, wherein the battery is enabled to power a component on the deployable payload in response to an impulse cartridge being connected with the IC cup and the battery is disabled in response to the impulse cartridge being disconnected from the IC cup. This exemplary embodiment or another exemplary embodiment may further provide a microcontroller on the deployable payload, wherein the microcontroller is in electrical communication with the battery; and wherein the microcontroller is the component that is powered by the battery when the impulse cartridge is connected with the IC cup and the microcontroller is not powered by the battery for a period of time after the impulse cartridge has been disconnected from the IC cup. This exemplary embodiment or another exemplary embodiment may further provide an active power mode of the battery associated with powering the component on the deployable payload when the impulse cartridge is connected to the IC cup; and an inactive mode of the battery associated with not powering the component on the deployable payload when the impulse cartridge is disconnected from the IC cup. This exemplary embodiment or another exemplary embodiment may further provide a switch within the cartridge case, wherein the switch permits transmission of power from the battery to the component in response to impulse cartridge being connected with the IC cup and the switch precludes transmission of power from the battery to the component in response to the impulse cartridge being disconnected from the IC cup. This exemplary embodiment or another exemplary embodiment may further provide that the switch is a field-effect transistor (FET). This exemplary embodiment or another exemplary embodiment may further provide a control card on the deployable payload, wherein the FET is located on the control card. This exemplary embodiment or another exemplary embodiment may further provide that the battery is on the control card. This exemplary embodiment or another exemplary embodiment may further provide a microcontroller on the control card. This exemplary embodiment or another exemplary embodiment may further provide a sensor electrically coupled to the microcontroller, wherein the sensor separated from the control card.

In yet another aspect, an exemplary embodiment of the present disclosure may provide a method comprising: obtaining a countermeasure device including a canister and a deployable payload within the canister, wherein the deployable payload is adapted to be deployed and expelled from the canister; inserting an impulse cartridge or squib into an IC cup; enabling a battery on the deployable payload to enter an active power mode in response to inserting the impulse cartridge or squib into the IC cup; removing the impulse cartridge or squib from the IC cup; and disabling the battery on the deployable payload such that the battery enters an inactive state in response to removing the impulse cartridge or squib into the IC cup.

In yet another aspect, an exemplary embodiment of the present disclosure may provide a method comprising: supplying a countermeasure device to an individual, customer or entity, wherein the countermeasure device includes a canister and a deployable payload within the canister, wherein the deployable payload is adapted to be deployed and expelled from the canister; causing or otherwise effecting the individual, customer or entity to insert an impulse cartridge or squib into an impulse cartridge cup (IC cup) on the canister; causing or otherwise effecting the individual, customer or entity to enable a battery on the deployable payload to enter an active power mode in response to the impulse cartridge or squib being inserted into the IC cup; causing or otherwise effecting the individual, customer or entity to remove the impulse cartridge or squib from the IC cup; and causing or otherwise effecting the individual, customer or entity to disable the battery on the deployable payload such that the battery enters an inactive state in response the impulse cartridge or squib from removed from the IC cup.

BRIEF DESCRIPTION OF THE DRAWINGS

Sample embodiments of the present disclosure are set forth in the following description, are shown in the drawings and are particularly and distinctly pointed out and set forth in the appended claims.

FIG. 16A (FIG. 16A) is a schematic view of the IC cup in conjunction with a battery hold up switch.

FIG. 16B (FIG. 16B) is a schematic view of the battery hold up switch.

Similar numbers refer to similar parts throughout the drawings.

DETAILED DESCRIPTION

Figure 1:
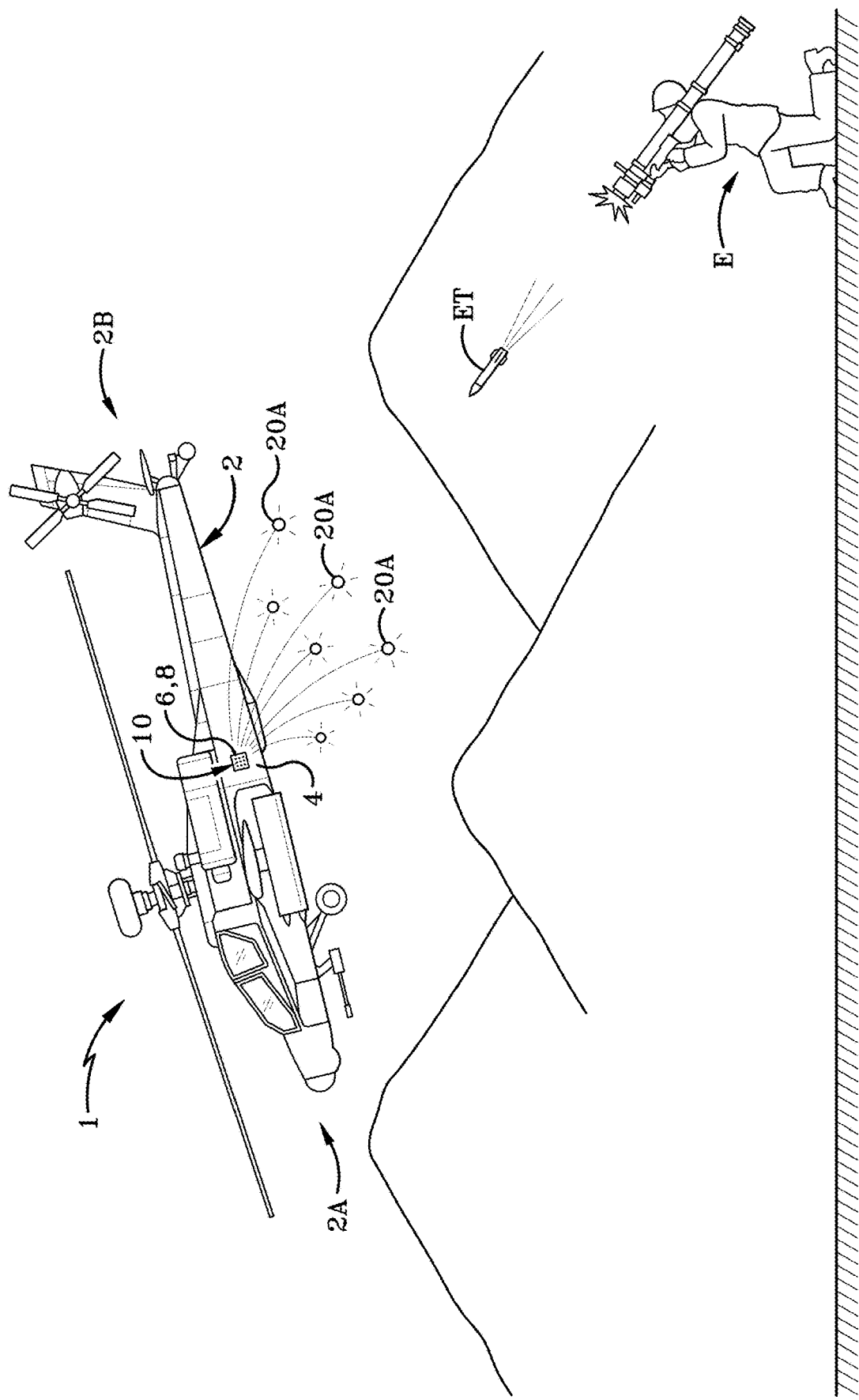
FIG. 1 (FIG. 1) is a diagrammatic view showing a platform having a CMDS, wherein CMDS is being used to deter an incoming enemy threat via countermeasure material.

FIG. 1 illustrates a platform 1 such as a vehicle, ship or aircraft, which may be manned or unmanned, that includes a main body 2. As used herein, aircraft refers to fixed or rotary wing aircraft as well as unmanned aerial vehicles (UAVs) and satellites. The main body 2 has a front end 2A and a rear end 2B longitudinally opposite to the front end 2A. It should be understood that the directions of "front," "rear," "top," "bottom," "right," and "left" are only used as a directional reference for the main body 2 and its associated components and/or parts described herein and illustrated in FIG. 1.

The platform 1 in this example is an aircraft and includes a sidewall 4 that extends longitudinally between the front end 2A of the main body 2 and the rear end 2B of the main body 2. The sidewall 4 defines an opening 6 that is disposed between the front and rear ends 2A, 2B of the main body 2 providing access to a chamber 8. The opening 6 and the chamber 8 defined by the sidewall 4 is sized and configured to receive a countermeasure dispensing system (hereinafter "CMDS") generally referred to as 10. CMDS 10 operably engages the sidewall 4 of the main body 2 to mechanically fix the CMDS 10 with the platform 1. As illustrated in FIG. 1, the CMDS 10 is in line with the sidewall 4 of the main body 2 such that the CMDS 10 is even or conformal with the mold line of the platform 1 for aerodynamic purposes. Upon mounting the CMDS 10, the CMDS 10 is electrically connected to a legacy wiring harness 12B that is provided in the platform 1 to provide power and communication to some or all electrical components in the CMDS 10, which is described in more detail below.

Prior to military operation or an aerial mission of the platform 1, the CMDS is pre-loaded with a set of countermeasure expendables 20. Each countermeasure expendable of the set of countermeasure expendables 20 is loaded with flare and/or chaff material 20A for countermeasure purposes. Expendables 20 may also include other countermeasure materials other than a flare or chaff. In addition, each countermeasure expendable of the set of countermeasure expendables 20 includes an impulse cartridge or squib for detonating and dispensing the countermeasure material 20A from the platform 1. During military operation, the countermeasure material 20A (e.g., flare and/or chaff material or other material) provides a distraction to an incoming enemy threat "ET", initiated by an enemy "E", where the incoming enemy threat "ET" is diverted to the flare and/or chaff material 20A while allowing the platform 1 to remain unscathed. During the military operation or the aerial mission, the platform 1 may receive a warning from an on-board electronic warfare (EW) system regarding the incoming enemy threat "ET" approaching the platform 1. Upon a determination made by the on-board EW system and/or an operator, the CMDS 10 dispenses a calculated amount of countermeasure expendables from the set of countermeasure expendables 20 that are disposed underneath, behind, or to the side of the platform 1. In addition, the CMDS 10 may also be provided along any suitable location of the platform 1 other than sidewall 4 of the main body 2. In one exemplary embodiment, a CMDS may be provided within a wing of an aircraft. In another exemplary embodiment, a CMDS may be provided in a fuselage or a pod disposed on an aircraft.

It should be understood that the CMDS 10 is logically powered and controlled by an on-board system. The system may include suitable devices and apparatuses that are operably engaged with one another to logically control and power the CMDSs (such as CMDS 10) described and illustrated herein. In the illustrated embodiments, CMDSs described and illustrated herein may be logically powered and controlled by a legacy on-board system retaining a majority of legacy devices and apparatuses that are operably engaged with and in communication with one another. Examples of legacy devices and apparatuses that may be provided in this system include, but not limited to, a cockpit interface, discrete components, serial buses, a programmer, and data links. In another instance, a CMDS described and illustrated herein may be logically powered and controlled by a new on-board system having new devices and apparatuses that are operably engaged with one another.

Moreover, it will be understood that the on-board system may also retain and use legacy components of legacy CMDSs currently available. In one instance, a CMDS described and illustrated herein may maintain a legacy dispenser along with a legacy wiring harness operably engaging the CMDS with the legacy on-board system. In another instance, a CMDS described and illustrated herein may only maintain a legacy wiring harness operably engaging the CMDS with the legacy on-board system. Furthermore, it will be understood that CMDSs described and illustrated herein may also use new components that are not legacy to an aircraft nor a legacy on-board system provided on the aircraft. Such use of legacy and/or new components of CMDSs are described in further details below.

Figure 2A:
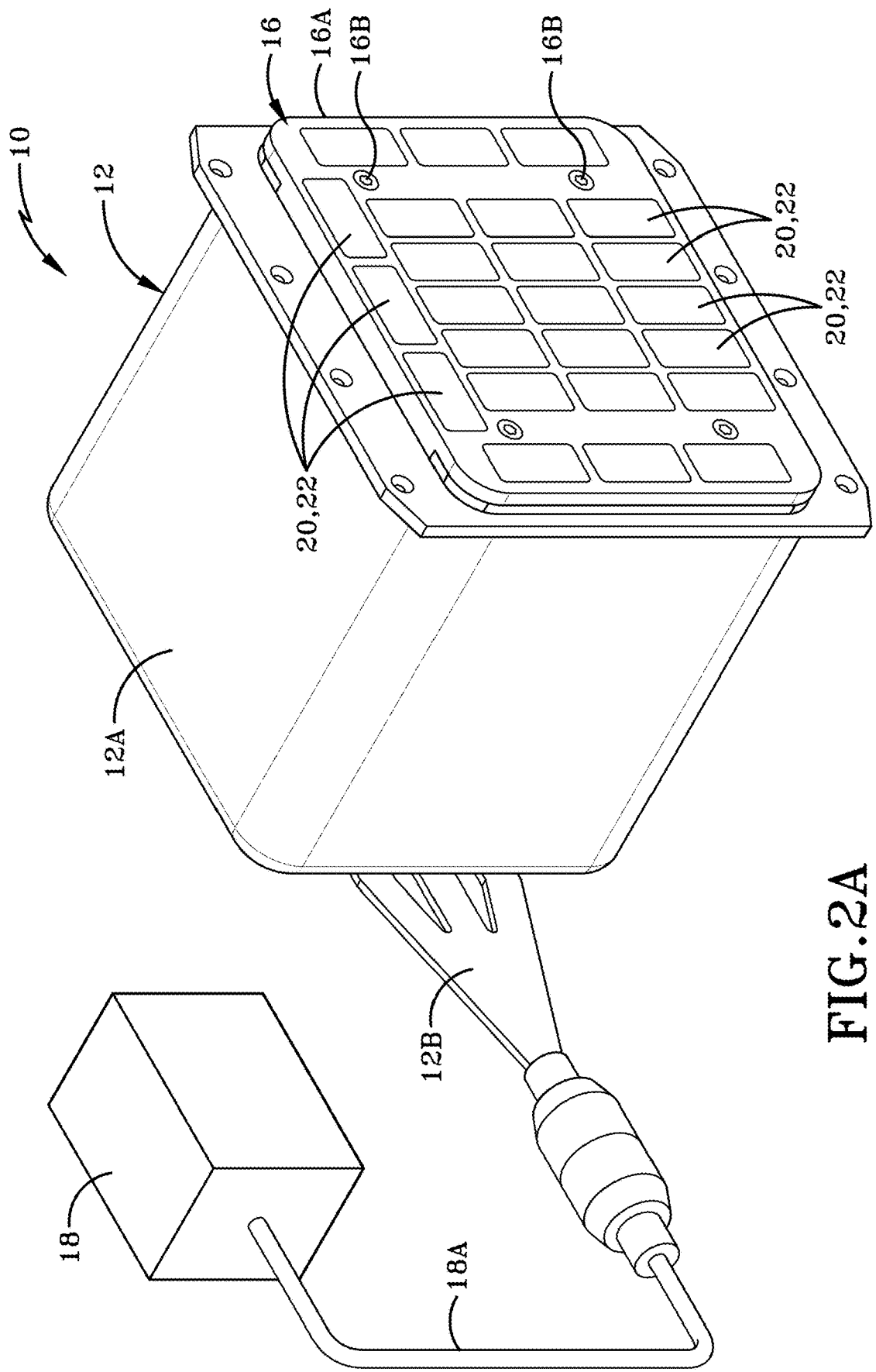
FIG. 2A (FIG. 2A) is a top, front, first side isometric perspective view of CMDS illustrated in FIG. 1, wherein CMDS is loaded with a set of countermeasure expendables.
Figure 2B:
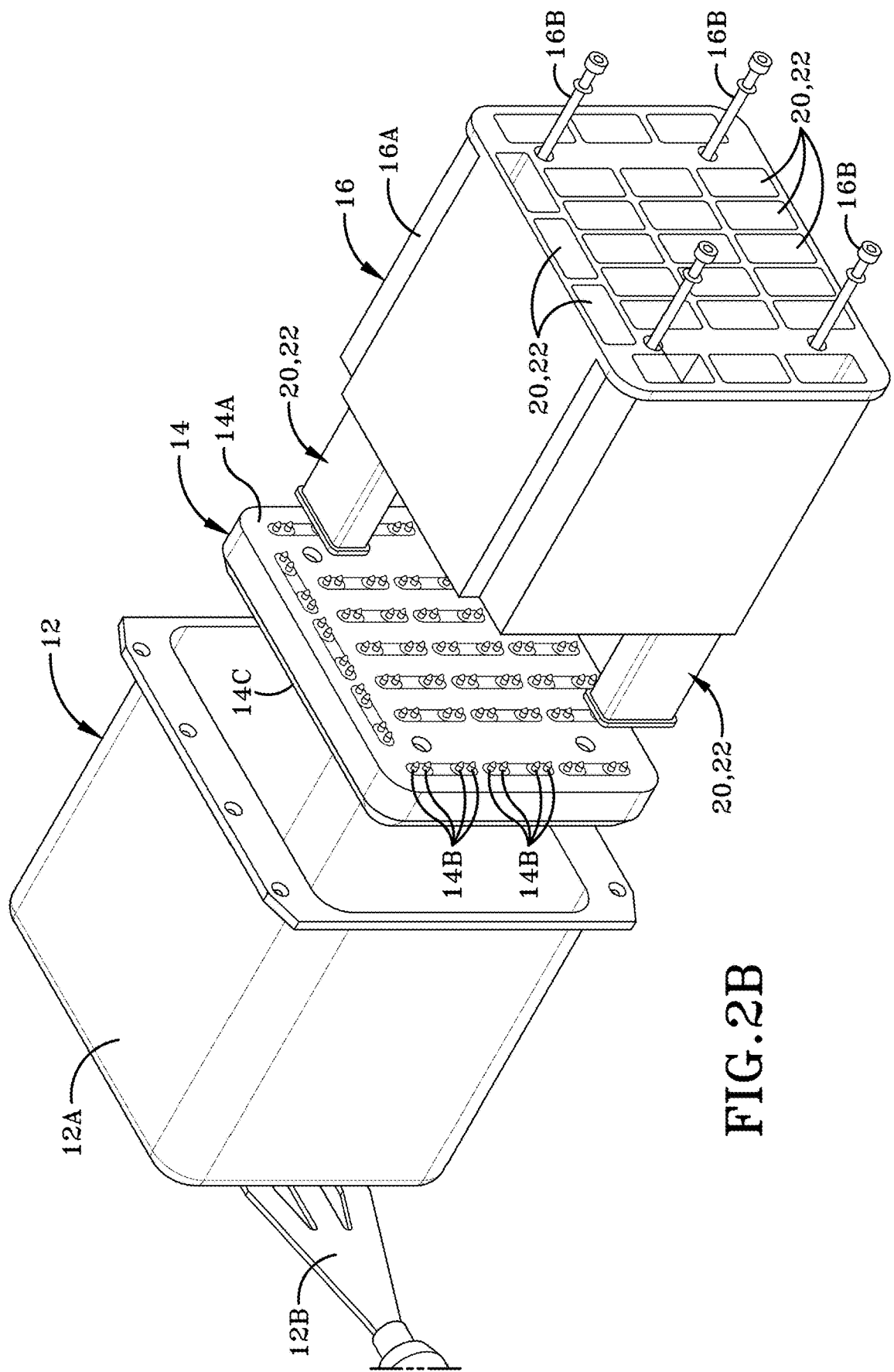
FIG. 2B (FIG. 2B) is an exploded view of the CMDS and the set of countermeasure expendables.

CMDS 10 includes a dispenser assembly 12 that operably engages with the platform 1 inside of the chamber 5 defined in the sidewall 4. As best seen in FIG. 2B, a dispenser 12A of dispenser assembly 12 is configured to hold various assemblies, components, and parts of CMDS 10 inside of the platform 1 for countermeasure operations, which are described in greater detail below. While not illustrated herein, connectors or fasteners may operably engage the dispenser assembly 12 with the platform 1, via a flange of the dispenser 12A, for maintaining the CMDS 10 with the platform 1; such engagement of the dispenser assembly 12 with the platform 1 may be conventional means currently used in the art. In other exemplary embodiments, connectors described previously may be any suitable components that are configured to operably engage a dispenser assembly with a platform for maintaining a CMDS with the platform (e.g., fasteners and other similar components of the like). In one exemplary embodiment, dispenser assembly 12 may be a legacy AN/ALE-47 dispenser used in a standard AN/ALE-47 CMDS. In another exemplary embodiment, dispenser assembly 12 may be a new dispenser assembly that is configured to be used with a new CMDS currently available on platforms discussed herein.

Dispenser assembly 12 also includes a legacy wiring harness 12B that operably engages with the dispenser 12A. Wiring harness 12B is configured to provide an electrical connection between the dispenser 12A and a sequencer of CMDS 10 provided on the platform 1 to enable logic communication between each of the dispenser 12A and the sequencer for dispensing and/or ejecting expendables from the CMDS 10. Such dispensing and ejecting of countermeasure expendables from the CMDS 10 is described in greater detail below.

Referring to FIG. 2B, CMDS 10 also includes a breechplate assembly 14 that operably engages with the dispenser assembly 12, particularly with the dispenser of the dispenser assembly 12. Upon assembly, the entire breechplate assembly 14 is housed inside of the dispenser 12A and provides forty-eight firing lines as compared to the legacy thirty fires lines provided in legacy CMDS. Such parts and components of the breechplate assembly 14 are discussed in greater detail below.

Breechplate assembly 14 includes a faceplate 14A. As best seen in FIG. 2B, faceplate 14A operably engages with the dispenser 12A inside of the dispenser 12A. As described in greater detail below, faceplate 14A also operably engages with a magazine assembly of CMDS and each countermeasure expendable of the set of countermeasure expendables 20 once CMDS 10 is assembled and loaded into the platform 1.

Breechplate assembly 14 also includes a set of first pin mechanisms 14B that operably engages with the faceplate 14A. In the illustrated embodiment, the set of firing pin mechanisms 14B is configured to operably engage with a set of countermeasure expendables (e.g., the set of countermeasure expendables 20) once loaded into the CMDS 10, which is described in more detail below. The set of firing pin mechanisms 14B may be any suitable firing pin mechanisms 14B that are capable of initiating impulse cartridges to dispense countermeasure material from countermeasure expendables known in the art. In one exemplary embodiment, a set of firing pin mechanisms that may be used include firing pin mechanisms described and illustrated in U.S. patent application Ser. No. 17/345,551. In another exemplary embodiment, a set of firing pin mechanisms that may be used include firing pin mechanisms described and illustrated in U.S. patent application Ser. No. 18/045,194. Both of these applications are incorporated herein by reference. While not illustrated herein, the faceplate 14A may be configured to house any suitable electrical connections and/or electrical wiring that operably engages with each firing pin mechanism of the set of firing pin mechanisms 14B. In one exemplary embodiment, the faceplate 14A described and illustrated herein may define cavities and/or recesses to accommodate and/or house any suitable electrical connections and/or electrical wiring that operably engages with each firing pin mechanism of the set of firing pin mechanisms. In one embodiment, there are two pairs of firing pins of the set of firing pin mechanisms 14B may then engage with a respective countermeasure expendable from the set of countermeasure expendables 20. There may be a first pair of firing pins of the set of firing pin mechanisms 14B that operably engages with the squib 26, and a second pair of firing pins the set of firing pin mechanisms 14B operably engages with the port plug 60 of the respective countermeasure expendable from the set of countermeasure expendables 20. The remaining pairs of firing pins of the set of firing pin mechanisms 14B also engage with the remaining countermeasure expendables from the set of countermeasure expendables 20. One pin from the pair of firing pin mechanism contacts a corresponding fire pin on the squib 26 and the other pin from the pair contacts the conductive annular end of the squib 26 to create a grounded circuit (See FIG. 15B).

Breechplate assembly 14 may also include a rear cover plate 14C that operably engages with the faceplate 14A via connectors (not illustrated). In the illustrated embodiment, rear cover plate 14C is configured to cover and protect a rear surface of the faceplate 14A along with any electrical connections and/or wires that electrically connect to the set of firing pin mechanisms 14B. Upon assembly, the rear cover plate 14C also operably engages with the dispenser 12A inside of said dispenser 12A.

CMDS 10 also includes a magazine assembly 16 that operably engages with the dispenser assembly 12 and the breechplate assembly 14. As best seen in FIG. 2B, magazine assembly 16 is configured to be attached with the breechplate assembly 14 and hold the set of countermeasure expendables 20. Once assembled, the breechplate assembly 14 and the magazine assembly 16 are operably engaged with the dispenser 12A and housed inside of the dispenser 12A with the set of countermeasure expendables 20 loaded inside of the magazine assembly 16. Such components and parts that make up the magazine assembly 16 are described in more detail below.

Magazine assembly 16 includes a magazine 16A. As best seen in FIG. 2B, magazine 16A operably engages with the breechplate assembly 14 and is configured to hold the set of countermeasure expendables 20. More particularly, the magazine 16A operably engages with the faceplate 14A and houses each countermeasure expendables of the set of countermeasure expendables 20. Prior to operably engaging with the faceplate 14A, the set of countermeasure expendables 20 are loaded into the magazine 16A. Once assembled, the breechplate assembly 14 and the magazine assembly 16 operably engage with the dispenser 12A and are housed inside of the dispenser 12A with the plurality of countermeasure expendables 20 being loaded inside of the magazine 16A.

Magazine assembly 16 also includes a set of connectors 16B. As best seen in FIGS. 2A-2B, the set of connectors 16B operably engages the breechplate assembly 14 and the magazine 16A with the dispenser 12A. Upon assembly, a portion of the magazine 16A may protrude outwardly from the dispenser 12A. In one exemplary embodiment, the entire magazine 16A may be disposed inside of the dispenser 12A such that an exterior end or exterior surface of the magazine 16A is flush with a flange of the dispenser 12A upon assembly.

While not illustrated herein, CMDS 10 may include a controller assembly or an embedded fire select multiplexer assembly (EFSM) that operably engages with one or more of the dispenser assembly 12, the breechplate assembly 14, and the magazine assembly 16. If included, controller assembly may also be configured to electrically connect with each firing pin mechanism of the set of firing pin mechanisms 14B for expanding the number of countermeasure expendables from thirty countermeasure expendables in legacy CMDSs (e.g., AN/ALE-47 systems) up to forty-eight countermeasure expendables while using legacy hardware and components. In one example, controller assembly may be controller assembly described and illustrated in U.S. patent application Ser. No. 17/345,551 for expanding the number of countermeasure expendables from thirty countermeasure expendables in legacy CMDSs (e.g., AN/ALE-47 systems) up to forty-eight countermeasure expendables while using legacy hardware and components. In another example, controller assembly may be controller assembly described and illustrated in U.S. patent application Ser. No. 18/045,194 for expanding the number of countermeasure expendables from thirty countermeasure expendables in legacy CMDSs (e.g., AN/ALE-47 systems) up to forty-eight countermeasure expendables while using legacy hardware and components.

CMDS 10 may also include a sequencer 18. As best seen in FIG. 2A, sequencer 18 may electrically connect with the breechplate assembly 14 via the wiring harness 12B of dispenser assembly 12. More particularly, sequencer 18 may electrically connect with each firing pin of the set of firing pins 14B of breechplate assembly 14 via wiring harness 12B of dispenser assembly 12. It should be understood that sequencer 18 may be located at any suitable location on the platform 1 while still being able to electrically connect with the breechplate assembly 14 via the wiring harness 12B of dispenser assembly 12.

As discussed previously, CMDS 10 also includes the set of countermeasure expendables 20 that is loaded into the magazine 16A of magazine assembly 16 for countermeasure operations. Each countermeasure expendable of the set of countermeasure expendables 20 may include countermeasure material (e.g., chaff material, flare material, etc.) for deterring enemy threats away from the platform 1 during combat and/or military operations. Such parts and components of each countermeasure expendable of the set of countermeasure expendables 20 are discussed in greater detail below.

Figure 3:
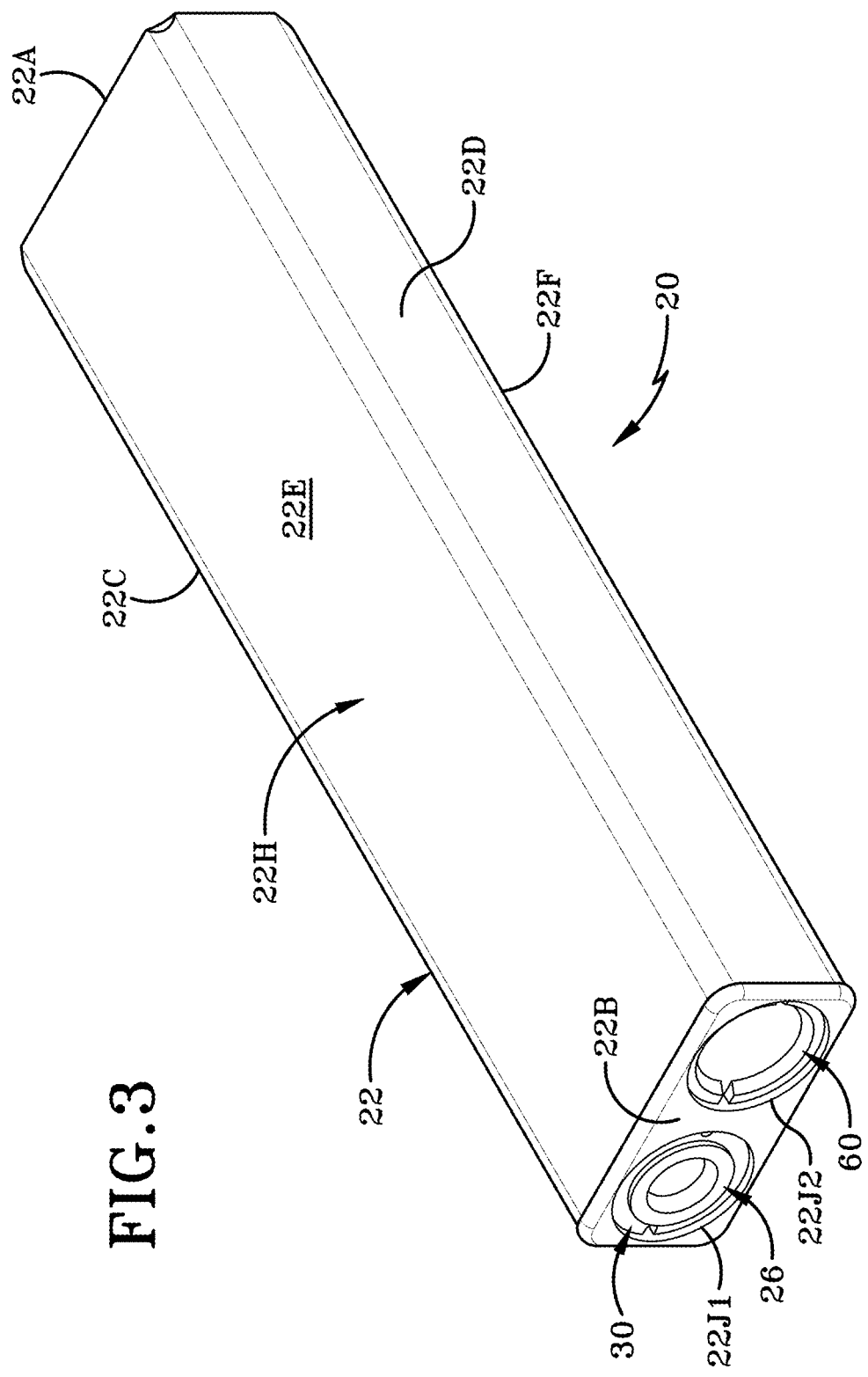
FIG. 3 (FIG. 3) is a top, rear, second side isometric perspective view of a countermeasure expendable of the set of countermeasure expendables.

Each countermeasure expendable of the set of countermeasure expendable 20 includes a canister 22. As best seen in FIG. 3, canister 22 includes a front wall 22A, and rear wall 22B longitudinally opposite to the front wall 22A, and a longitudinal axis defined therebetween. Canister 22 also includes a first side wall 22C extending between the front wall 22A and the rear wall 22B, a second side wall 22D extending between the front wall 22A and the rear wall 22B and transversely opposite to the first side wall 22C, and a transverse axis defined therebetween. Canister 22 also includes a top wall 22E that is positioned vertically above the front wall 22A, the rear wall 22B, the first side wall 22C, and the second side wall 22D, a bottom wall 22F that is positioned vertically below the front wall 22A, the rear wall 22B, the first side wall 22C, and the second side wall 22D and vertically opposite to the top wall 22E, and a vertical axis defined therebetween.

Canister 22 also defines a chamber 22G. As best seen in FIG. 5, chamber 22G is collectively defined by the front wall 22A, the rear wall 22B, the first side wall 22C, the second side wall 22D, the top wall 22E, and the bottom wall 22F. Canister 22 also includes an exterior surface 22H that extends along each of the front wall 22A, the rear wall 22B, the first side wall 22C, the second side wall 22D, the top wall 22E, and the bottom wall 22F external to or outside of the chamber 22G. Canister 22 also includes an interior surface 22I that extends along each of the front wall 22A, the rear wall 22B, the first side wall 22C, the second side wall 22D, the top wall 22E, and the bottom wall 22F internal to or inside of the chamber 22G.

Figure 5A:
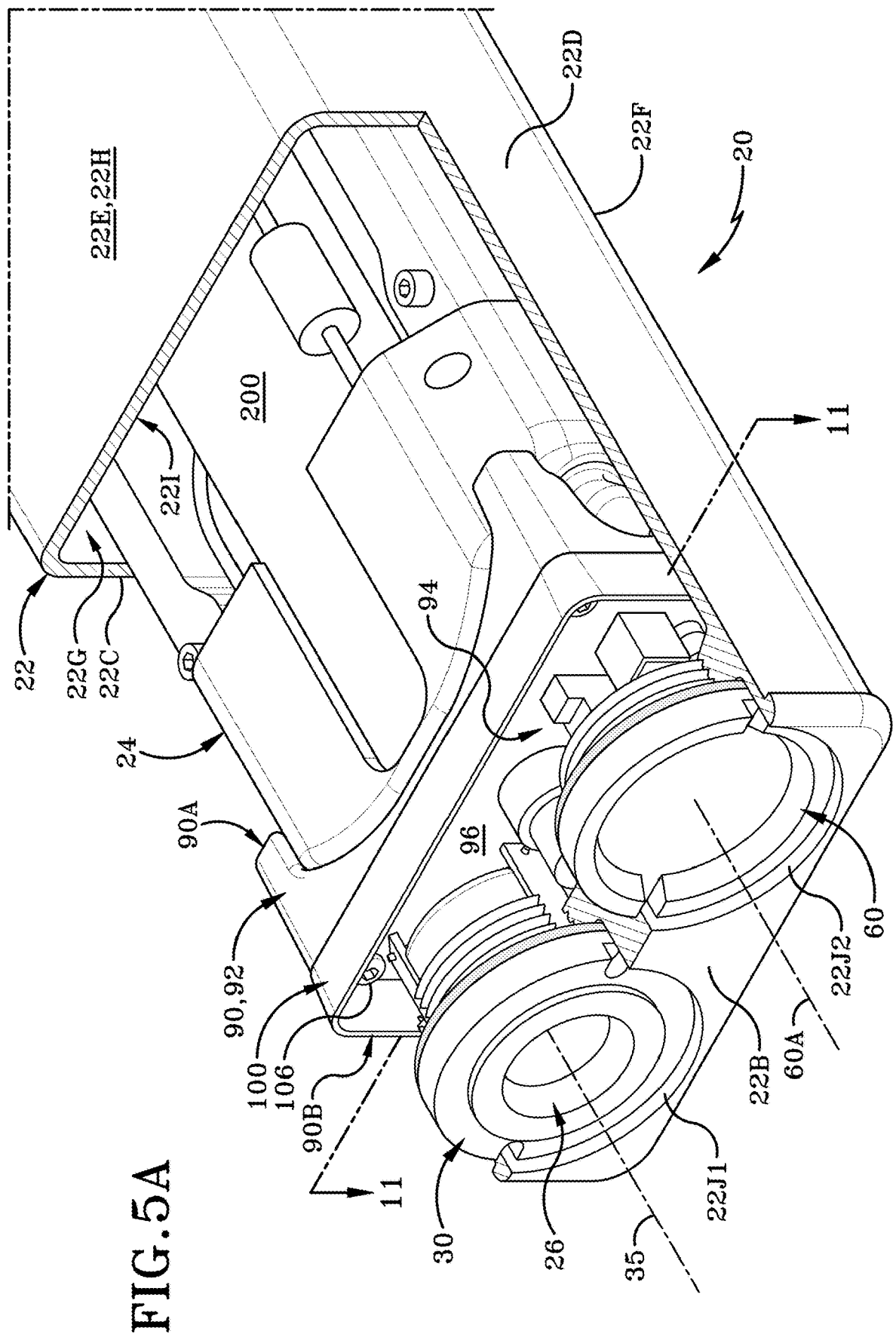
FIG. 5A (FIG. 5A) is a rear cutaway view of a canister of the countermeasure expendable shown in FIG. 3.

Canister 22 also defines at least one threaded opening 22J. As best seen in FIGS. 5-6, canister 22 defines a first threaded opening 22J1 that extends longitudinally from the rear wall 22B towards the front wall 22A. Canister 22 also defines a second threaded opening 22J2 that extends longitudinally from the rear wall 22B towards the front wall 22A. As best seen in FIG. 5, the first threaded opening 22J1 and the second threaded opening 22J2 are adjacent with one another and are transversely opposite one another relative to a longitudinal centerline. The first threaded opening 22J1 also provides open communication between the chamber 22G defined in canister 22 and the external environment surrounding the canister 22. Similarly, the second threaded opening 22J1 also provides open communication between the chamber 22G defined in canister 22 and the external environment surrounding the canister 22. Such uses of the first threaded opening 22J1 and the second threaded opening 22J2 are discussed in greater detail below.

Each countermeasure expendable of the set of countermeasure expendables 20 may also include a payload 24. As best seen in FIG. 5A, payload 24 may be any suitable countermeasure material that, when ejected from canister 22, diverts or deters one or more enemy threats away from the platform 1. Payload 24 may also include a processing unit or microprocessor that is configured to eject and dispense the countermeasure material at a suitable distance away from the platform 1 dictated by the military operation.

Figure 4:
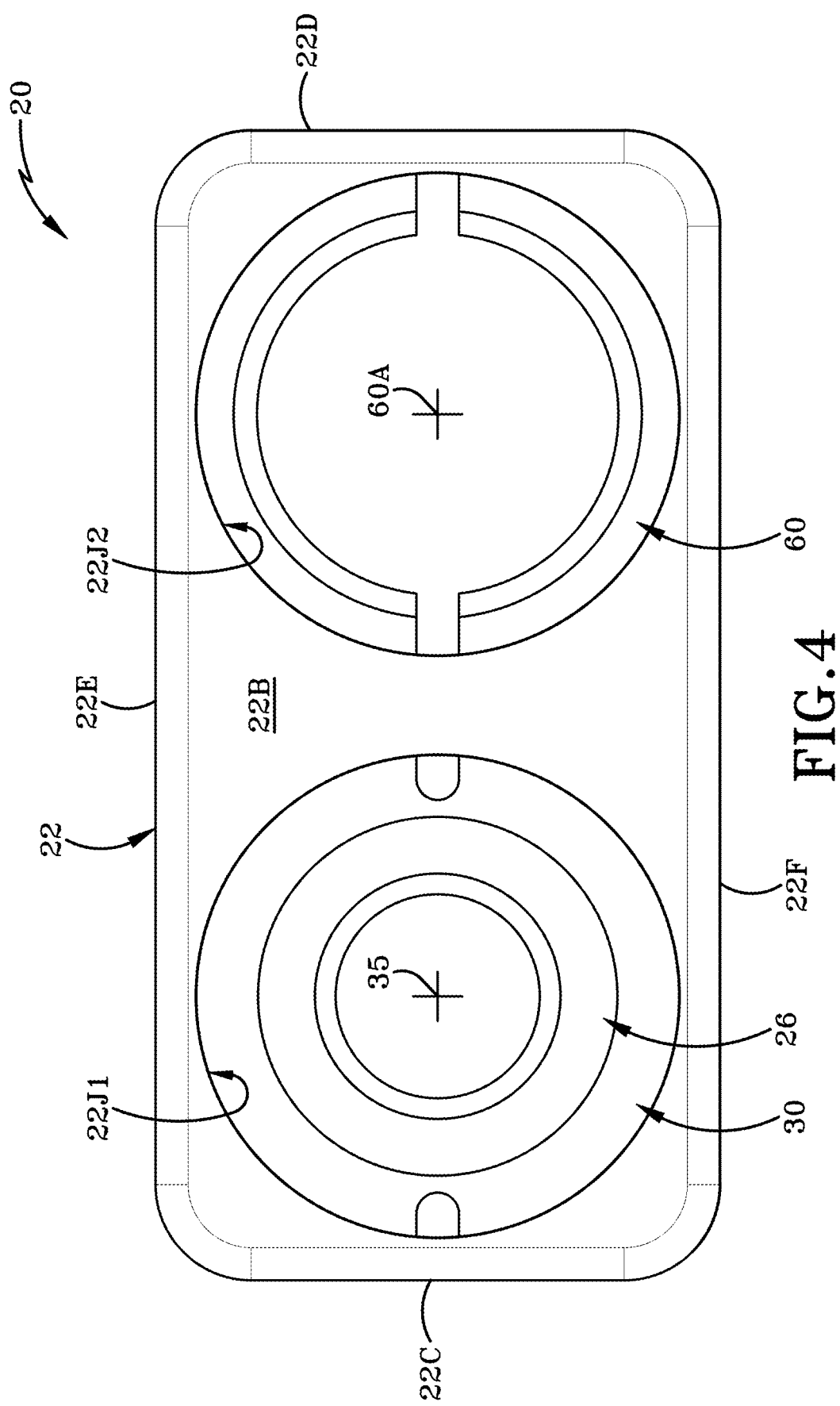
FIG. 4 (FIG. 4) is a rear elevation view of the countermeasure expendable shown in FIG. 3.

Each countermeasure expendable of the set of countermeasure expendables 20 may also include an impulse cartridge or squib 26. As best seen in FIGS. 4-5, squib 26 is configured to eject the payload 24 and other components of the countermeasure expendable 20 (discussed in greater detail below) from the canister 22 for dispensing countermeasure material at a suitable distance away from the platform 1 as dictated by the military operation.

Each countermeasure expendable of the set of countermeasure expendables 20 may also include an impulse cartridge cup 30. As best seen in FIG. 5A, impulse cartridge cup 30 operably engages with the rear wall 22B of the canister 22. More particularly, impulse cartridge cup 30 may threadably engage with the rear wall 22B of the canister 22 via the first threaded opening 22J1. Upon engagement with canister 22, a portion of the impulse cartridge cup 30 is positioned inside of the canister 22 in which impulse cartridge cup 30 effectuates communication between the chamber 22G of canister 22 and the external environment of the canister 22 at the first threaded opening 22J1. Upon engagement with canister 22, a portion of impulse cartridge cup 30 is also partially positioned outside of chamber 22G of canister 22. As best seen in FIGS. 17A-17B, impulse cartridge cup 30 is configured to receive and house squib 26 for ejecting and dispensing the countermeasure material at a suitable distance away from the platform 1 dictated by the military operation. As discussed in greater detail below, impulse cartridge cup 30 may also be configured to send and/or output at least one signal to a smart piston of countermeasure expendable 20 upon engaging with squib 26.

FIG. 6-FIG. 10 depict that the impulse cartridge (IC) cup 30 is a high precision cup that is shaped generally like a thimble that is configured to be connected to an end or rear wall 22B of canister 22 that stores a dispensable or expendable payload 24. The IC cup 30 defines a cavity 30A that is configured to receive an impulse cartridge or squib 26 in order to fire or project the payload upon explosion of the squib/impulse cartridge. The cavity 30A may be plugged with a flexible gasket-type plug 31 when the squib 26 is not inserted into the cavity 30A. The end or rear wall 30B of the IC cup 30 is machined with purposeful perforations or destruction lines that purposely deteriorate or break in response to the explosion of the squib 26.

The IC cup 30 of the present disclosure enables signals to be sent through the IC cup 30 without disrupting the high precision burst plate or end wall 30B that has the purposefully constructed weakened lines or perforations. Stated otherwise, the weakened lines, which also may be referred to as score lines, are highly regulated and precisely machined to ensure that constant pressure is applied into the cavity of the payload upon explosion of the squib 26. Therefore, the IC cup 30 of the present disclosure enables signals to be sent through the IC cup 30 by constructing or defining a plurality of apertures 32 or through holes that are defined in the sidewall 30C of the IC cup 30.

Figure 8:
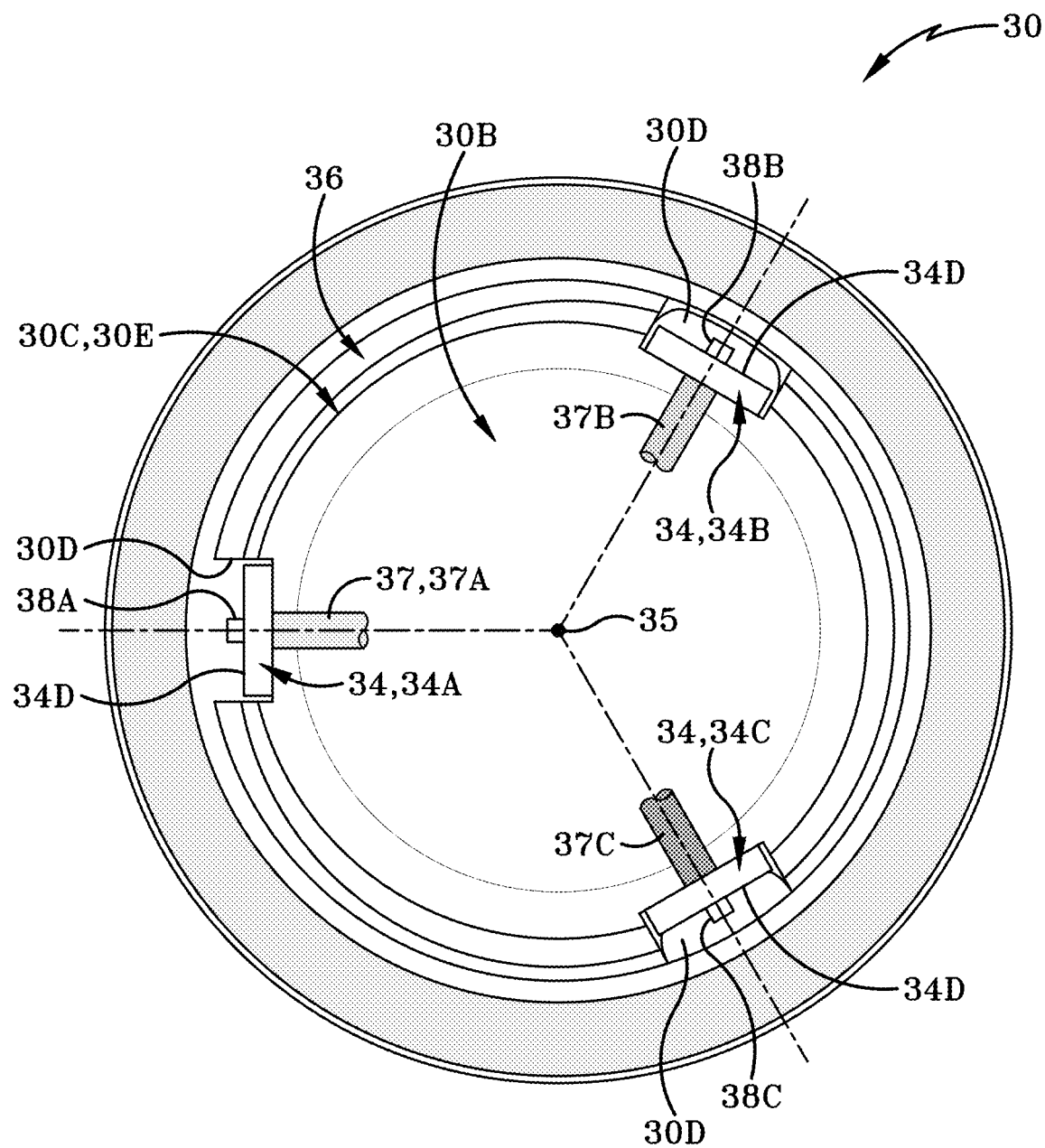
FIG. 8 (FIG. 8) is a rear end elevation view of an impulse cartridge cup according to an exemplary embodiment of the present disclosure.
Figure 9:
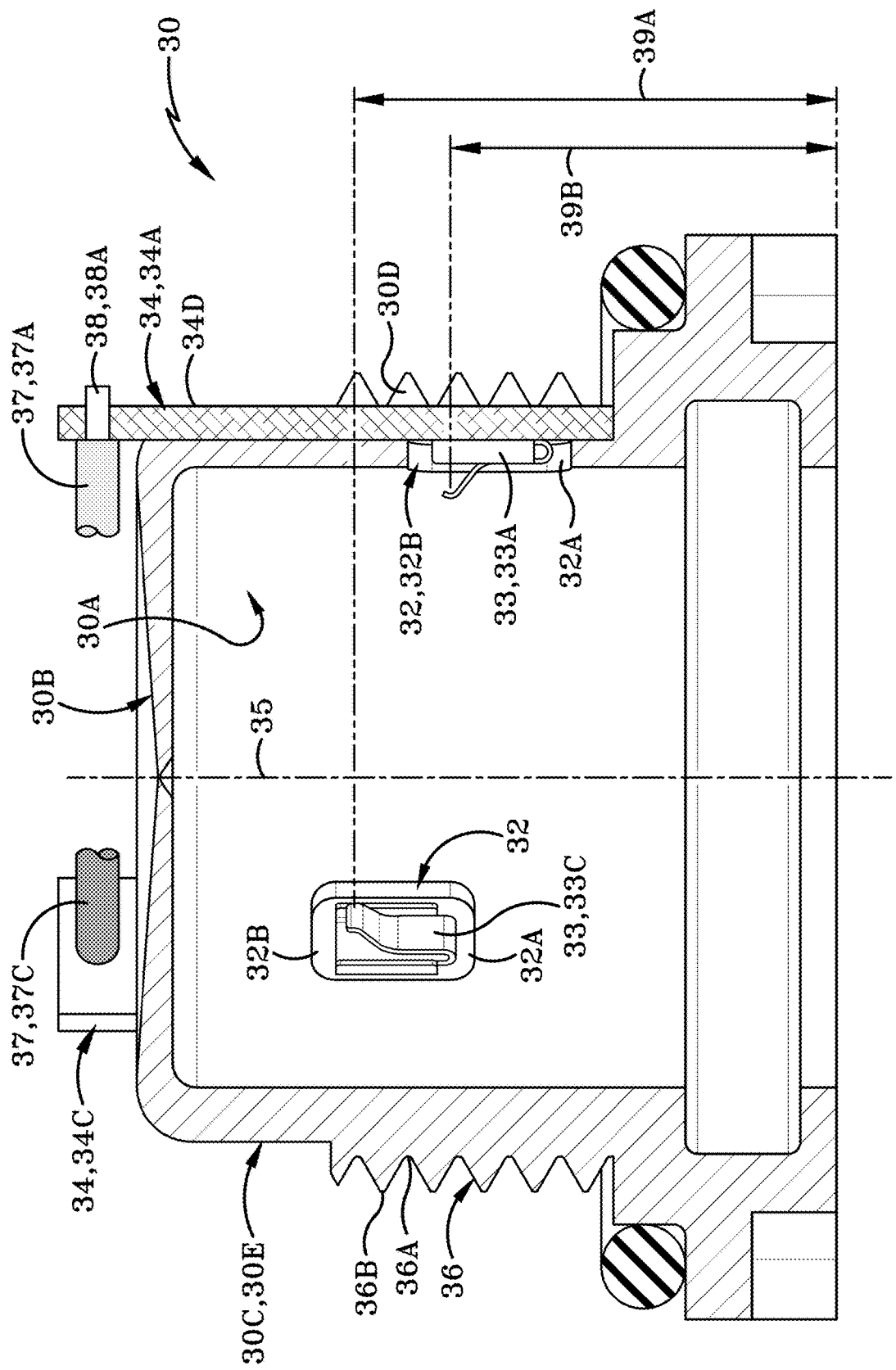
FIG. 9 (FIG. 9) is a cross section view of the impulse cartridge cup taken along line 9-9 in FIG. 6.
Figure 10:
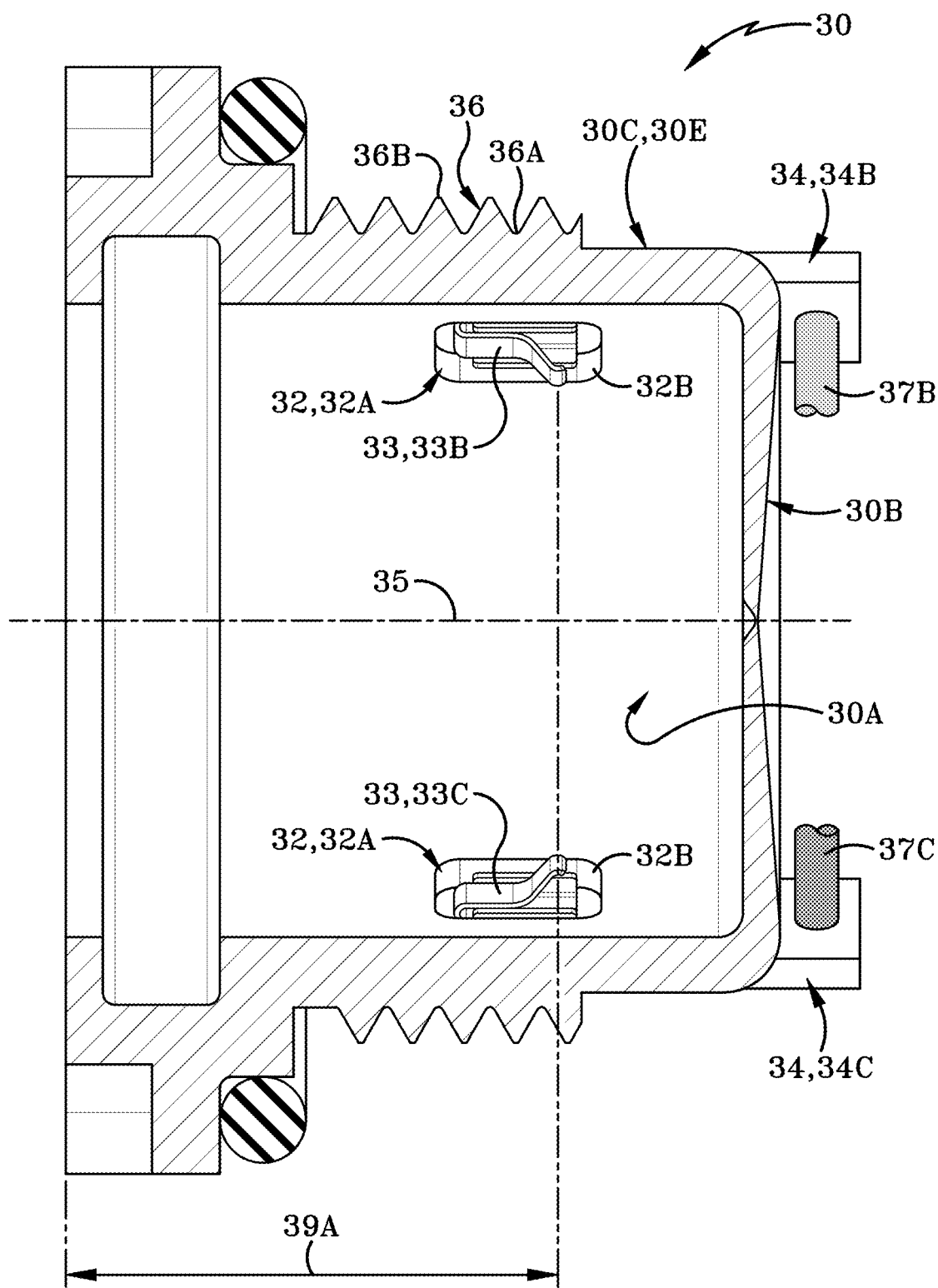
FIG. 10 (FIG. 10) is a cross section view of the impulse cartridge cup taken along line 10-10 in FIG. 6.
Figure 11:
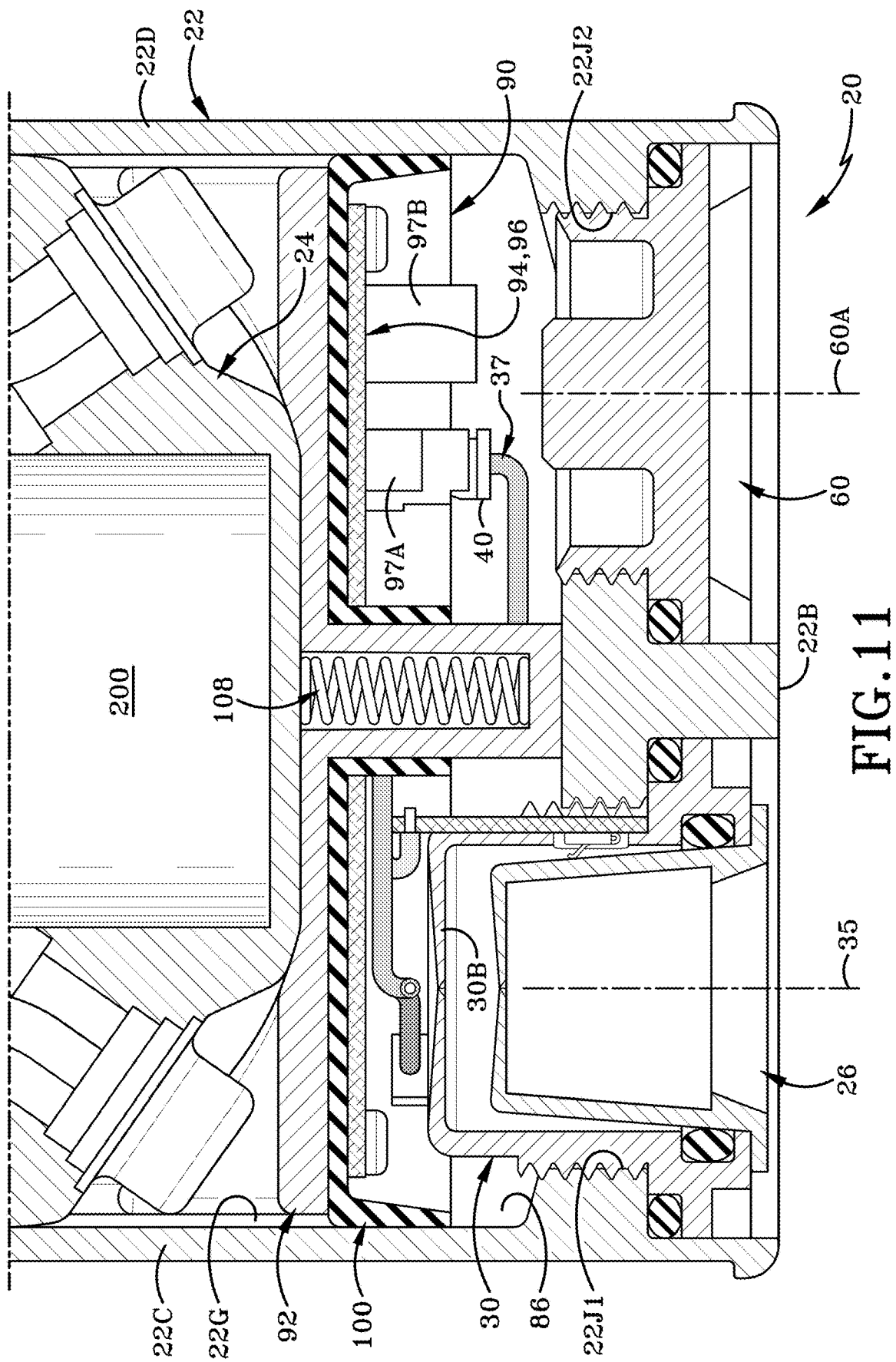
FIG. 11 (FIG. 11) is a partial sectional view of the smart piston taken in the direction of line 11-11 in FIG. 5A.

There are at least three electrical connectors 33 carried by IC cup 30. In order for electrical connectors 33 to be disposed through the sidewall 30C of the IC cup 30, the exterior surface of sidewall 30C of IC cup 30 may be machined, drilled, or otherwise cut away to create a channel or kerf 30D that receives a carrier board 34 to dispose an electrical connector 33 within an aperture 32 that is in open communication with the cavity 30A of IC cup 30. More particularly, a first carrier board 34A carriers a first electrical connector 33A, a second carrier board 34B carriers a second electrical connector 33B, and a third carrier board 34C carriers a third electrical connector 33C. As depicted in FIG. 8, each carrier board that carries one electrical connector 33 is offset 120° from an adjacent electrical connector relative to a central primary axis 35.

Each channel 30D on the exterior surface 30E of the IC cup 30 allows each carrier board 34 to be disposed below the exterior threads 36 formed in the outer surface 30E. For example, the lowermost surface of thread 36 relative to a central primary axis 35, which may be considered the nadir or valley 36A of each thread is located slightly above or coplanar with an exterior surface 34D of each carrier board 34 so as to allow the threads 36 to still operate to connect with corresponding threads on the first threaded opening 22J1 of canister 22 without having any interference by the carrier board 34. Furthermore, the peaks of the threads on the first opening 22J1 will contact the exterior surface 34D of the carrier board 34 to assist with retaining the carrier board 34 in position when an explosion or pressure occurrence happens to ensure that the electrical components or connectors 33 carried by each carrier board 34 stay connected to the squib 26 or impulse cartridge that is retained in the IC cup 30.

In one particular embodiment, each electrical connector 33 is a bowlegged spring connector. A typical bowlegged spring connector is a small component typically on the order of about 0.04 inches in width. The manner in which the electrical connector 33 is connected to the carrier board 34 may be accomplished through a re-flow connection technique. Hand soldering is likely not possible given the small size of the electrical connector 33. Each electrical connector is disposed within one of the aperture 32 formed in the sidewall 30C of the IC cup 30 but does not touch the sidewall of the IC cup 30. As such, there is a gap 32A between the first end of the electrical connector 33 and the sidewall 30C of the IC cup 30 and there is a gap 32B between the second end of the electrical connector 33 and the sidewall 30C of the IC cup 30. In one particular embodiment, the two gaps 32A, 32B ensure that the electrical connector does not short out or ground to the body or sidewall of the IC cup 30.

The IC cup 30 of the present disclosure is configured to be used with any type of impulse cartridge or squib 26. One exemplary squib 26 is a smart squib or smart impulse cartridge having communication capabilities. Although the IC cup 30 of the present disclosure has been discussed herein with respect to a smart impulse cartridge or smart squib, the IC cup of the present disclosure can be utilized with a conventional or "dumb" squib that does not have any electrical communications there through. When using a conventional squib, the conventional squib will be inserted into the cavity of the IC cup 30 of the present disclosure (after removing the plug) and all three electrical contacts or connectors 33A, 33B, and 33C will contact the exterior surface of the conventional squib and short out. Thus, when they short and ground to each other, it will still activate the payload 24 inside the canister 22 or cartridge case or housing. This allows the IC cup 30 of the present disclosure to be backwards compatible with previous legacy conventional squibs in conjunction with future developed smart squibs.

Each carrier board 34 has an end that extends from the IC cup 30. Each end is coupled with a respective wire 37 that is connected with a connector 40 to a port on the back of the piston assembly of piston 90. The wire 37A connected to the carrier board 34A via pin 38A carries the serial communication signals to the connector 40 for transmission into the payload 24. The carrier board 34A carrying the electrical connector 33A for the serial communication signal is longer than the other two carrier boards 34B, 34C because the longer board needs to enable the electrical connector 33A for communication signals to contact the electrically conductive annular ring on the smart squib while the other two shorter carrier boards 34B, 34C allow for the other two electrical connectors 33B, 33C to ground or otherwise short to the squib body via wires 37B, 37C, respectively. Thus, relative to the longitudinal length of the cylindrical sidewall 30C of the IC cup 30, two of the electrical connectors 33B, 33C are at the same longitudinal position, as depicted by dimension 39A, and the first electrical connector 33A or at least one other electrical connector is at a different position, as depicted by dimension 39B, relative to the longitudinal length of the IC cup 30. Dimension 39B is smaller than dimension 39A when measured relative to the opening to the cavity 30A (see FIG. 9).

With respect to the wires 37, the first wire 37A is the serial communication wire. The second wire 37B is the ground wire. The third wire 37C is the enable wire, which effectively provides communication to an enable pin on piston 90, wherein the enable pin is in electrical communication with the processor of the payload 24. Thus, whenever a squib 26 is plugged in to the IC cup 30 of the present disclosure, the second electrical connector 33B shorts out the third electrical connector 33C by both touching the case or housing of squib 26 simultaneously. This is electrical short is accomplished because the case or body of squib 26 is conductive and thereby connects the second wire 37B to the third wire 37C to effectively short out to enable the small battery that enables the microprocessor to start functioning with the payload 24, and the signals that are enabled to be activated are transmitted through the serial communication wire 37A associated with the first connector 33A contacting the outer annular ring of the smart squib or smart impulse cartridge.

Each countermeasure expendable of the set of countermeasure expendables 20 may also include a port plug 60. As best seen in FIG. 5, port plug 60 operably engages with the rear wall 22B of the canister 22. More particularly, port plug 60 may threadably engage with the rear wall 22B of the canister 22 via the second threaded opening 22J2. Upon engagement with canister 22, port plug 60 is positioned entirely inside of the canister 22 in which port plug 60 impedes communication between the chamber 22G of canister 22 and the external environment of the canister 22 at the second threaded opening 22J2. Upon engagement with canister 22, port plug 60 is also partially positioned inside of chamber 22G of canister 22. During operation, port plug 60 may be removed and/or threadably disengaged from the second threaded opening 22J2 for testing operations.

Each countermeasure expendable of the set of countermeasure expendables 20 may also include a smart piston 90. As best seen in FIGS. 5-6, smart piston 90 operably engages with the canister 22 forwardly of the rear wall 22B, the impulse cartridge cup 30, and the port plug 60. More particularly, smart piston 90 operably engages with the first side surface 22C, the second side surface 22D, the top wall 22E, and the bottom wall 22F inside of the chamber 22G along the interior surface 22I. As discussed in greater detail below, smart piston 90 enables one or more electrical signals to be passed between the payload 24 and the impulse cartridge cup 30 during testing operations and firing operations. Such parts and components of smart piston 90.

Each countermeasure expendable of the set of countermeasure expendables 20 may also include a smart piston 90. As best seen in FIG. 5A smart piston 90 includes a front or fore end 90A that is proximate to payload 24 and remote from rear wall 22B. Smart piston 90 also includes a rear or aft end 90B that is opposite to the front end 90A and is proximate to the rear wall 22B and remote from the payload 24. Upon assembly, smart piston 90 operably engages with the canister 22 forwardly of the rear wall 22B, the impulse cartridge cup 30, and the port plug 60. More particularly, smart piston 90 operably engages with the first side wall 22C, the second side wall 22D, the top wall 22E, and the bottom wall 22F inside of the chamber 22G along the interior surface 22I forwardly of the rear wall 22B, the impulse cartridge cup 30, and the port plug 60. As discussed in greater detail below, smart piston 90 enables one or more electrical signals to be passed between the payload 24 and the impulse cartridge cup 30 during testing operations (see FIGS. 12-14) and firing operations (FIGS. 15A-15C). Such parts and components of smart piston 90 are described in greater detail below.

Figure 5B:
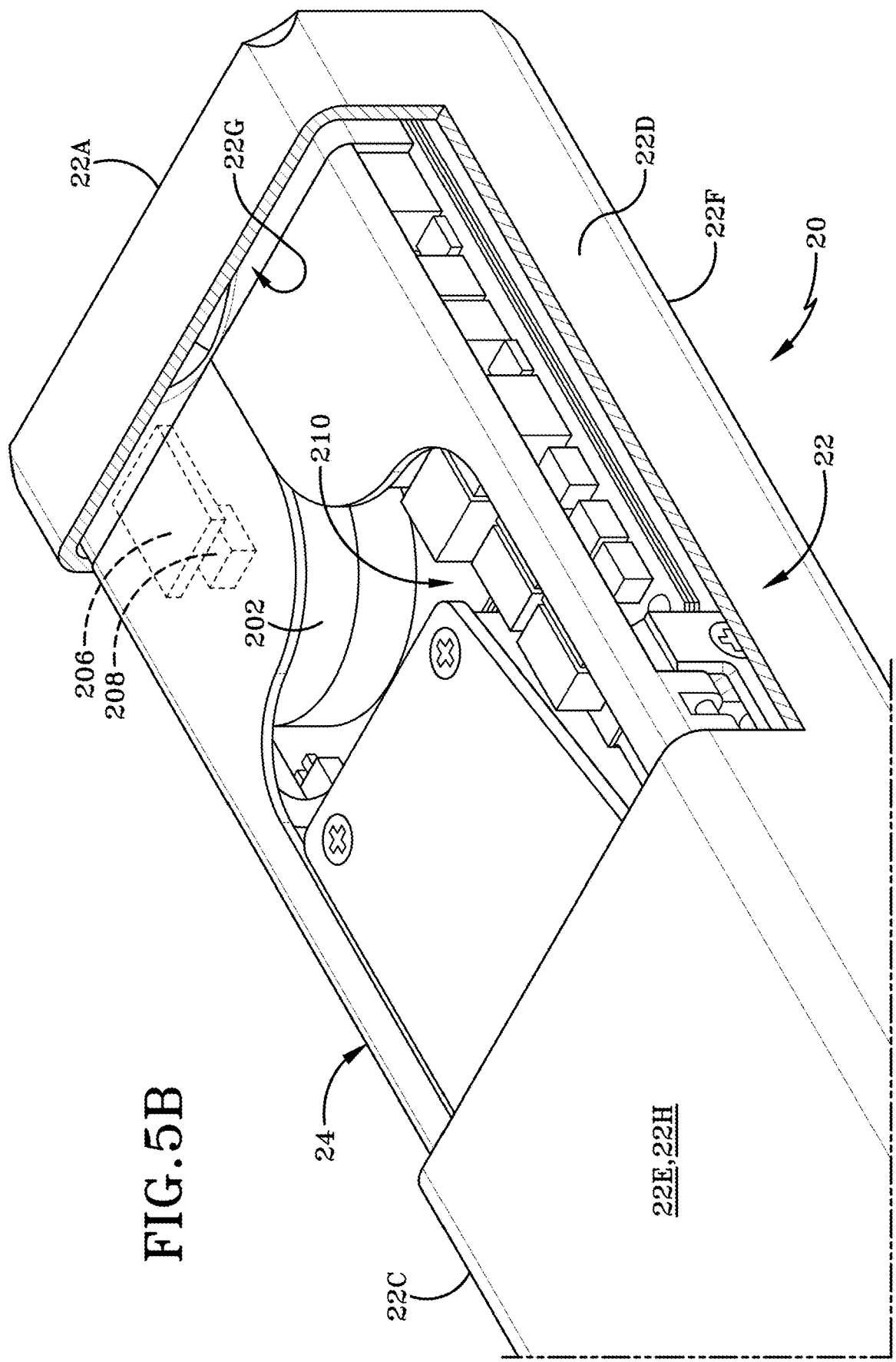
FIG. 5B (FIG. 5B) is a forward cutaway view of the canister of the countermeasure expendable shown in FIG. 3.
Figure 6:
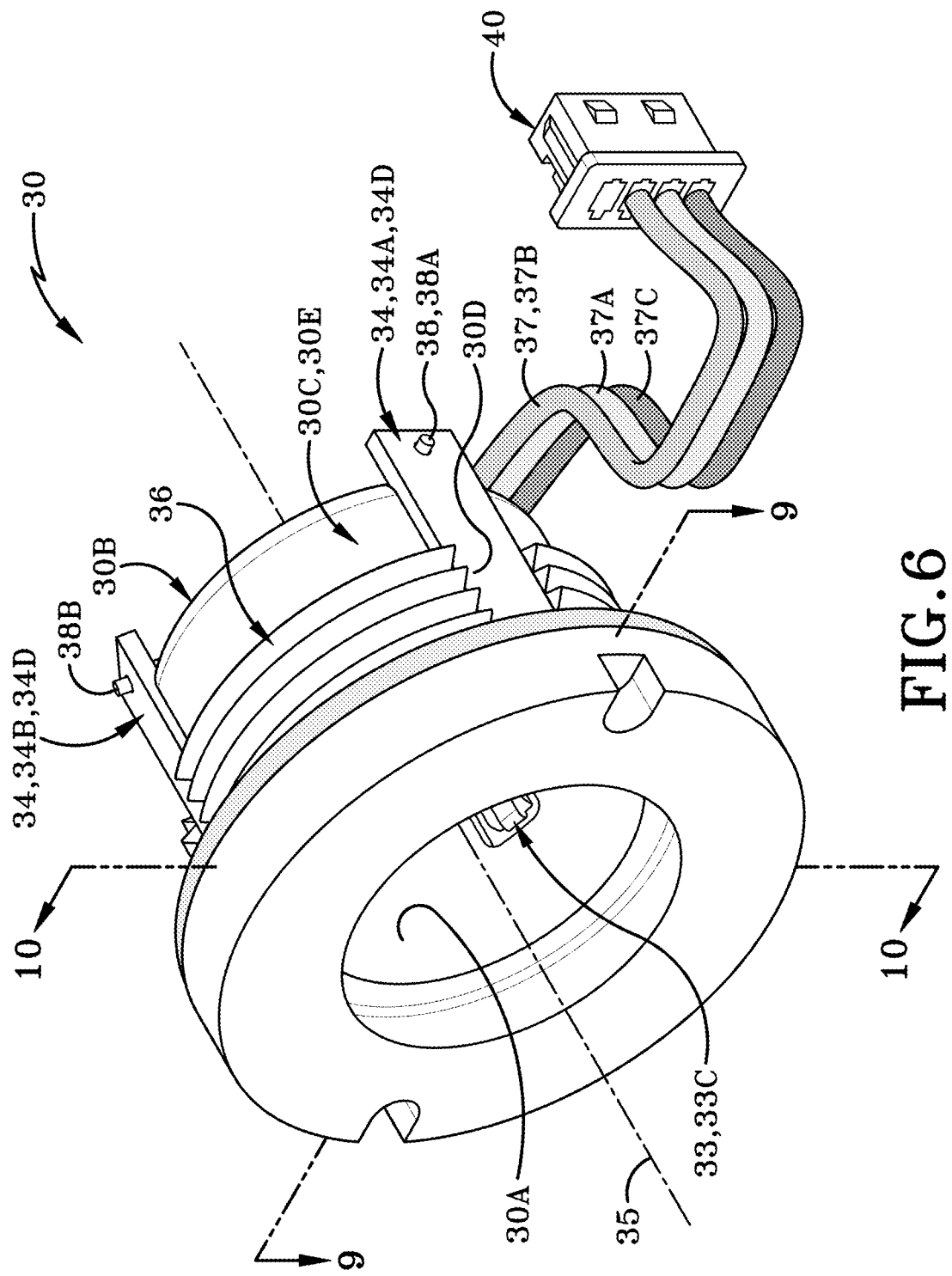
FIG. 6 (FIG. 6) is a front perspective view of an impulse cartridge cup according to an exemplary embodiment of the present disclosure.
Figure 7:
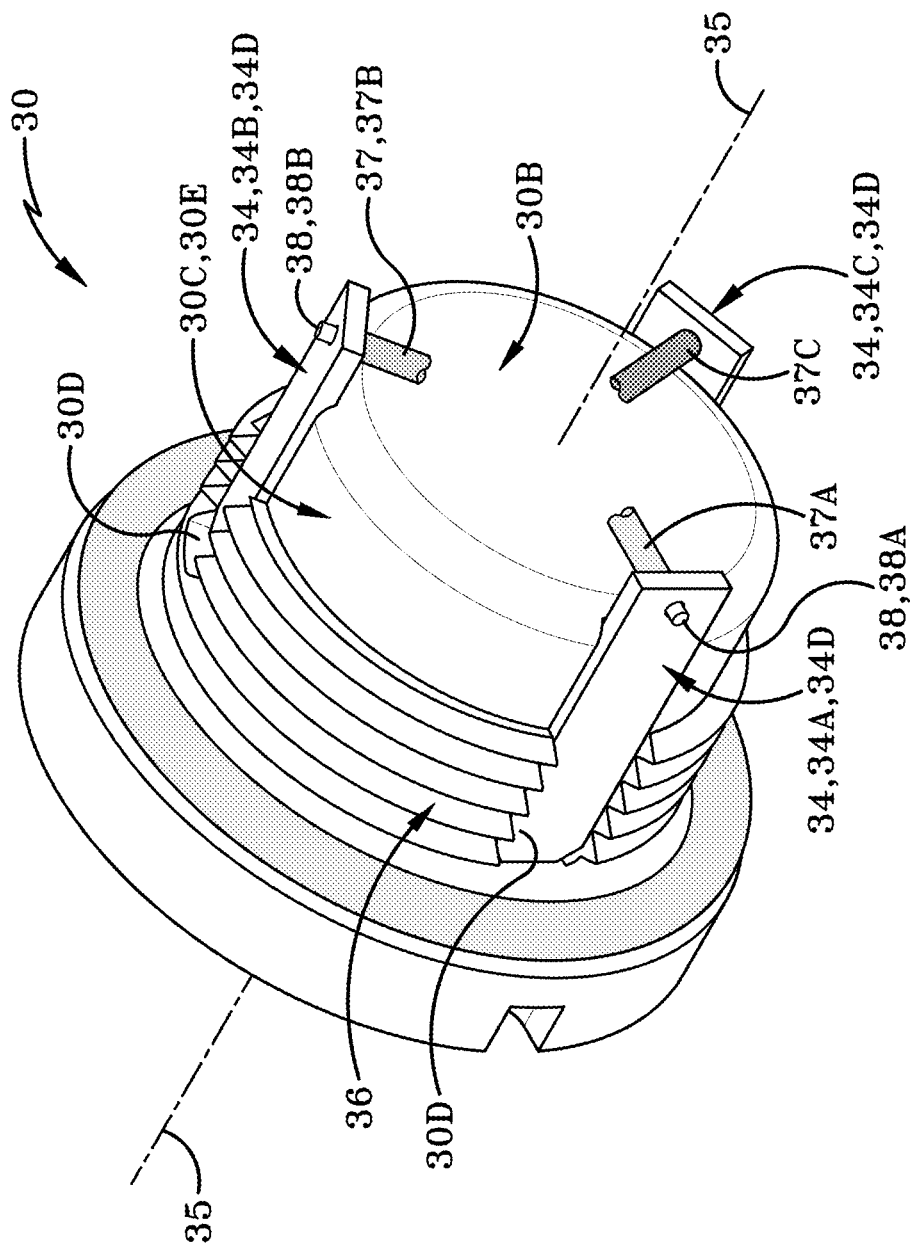
FIG. 7 (FIG. 7) is a rear perspective view of an impulse cartridge cup according to an exemplary embodiment of the present disclosure.

FIG. 5A and FIG. 5B depict that the expendable 20 also includes a primary battery 200 and a secondary battery 202 coupled to a hold up switch circuit 204 (FIG. 16B). The payload 24 is powered from the primary battery 200, such as a thermal battery when, payload 24 is ejected from the platform 1. The primary battery 200 is activated when the system or payload 24 is launched from the platform 1. Particularly, there is a primer in the thermal battery 200 that is struck in response to forces exerted on the battery 200 in response to the ejection of the payload 24. Thus, that thermal battery 200 is the primary battery that powers the electronics during flight of the payload 24. However, there are other batteries located on the payload that are required for the operation thereof shortly before the activation of the primary battery 200. These secondary functions that occur before launch of the payload do not need as much power and can therefore be power by a smaller battery source, such as the secondary battery 202. The smaller battery source or secondary battery 202 can be a coin cell battery located on the payload 24. Because the thermal primary battery 200 takes some time to power up due to the chemical reaction, the coin cell secondary battery 202 is utilized to power smaller functions before the launch of the payload 24 or after the launch of the payload 24 that must occur before full activation of the chemical primary battery 200.

The secondary battery 202 may be a long term storage battery that is required to maintain data in the microcontroller 206. The battery 202 also provides power for various sensors 208, such as accelerometers and gravity switches/meters or other sensors. One exemplary secondary battery 202 is a Tadiran TLH-2450 battery cell. However, other battery types are entirely possible. When selecting this battery or other types of batteries, some exemplary parameters that should be accounted for are that the battery 202 may have an operating temperature range from −55° C. to about 125° C., the battery should have low self-leakage (such as 1.55 µA at 25° C., 2.86 µA at 80° C.), and the battery should have sufficient capacity projected after 10+ years of storage (which supports about 7000 hours of operation). One exemplary battery that meets these parameters is a Lithium Thionyl Chloride (LiSOCL$_2$) primary chemistry coin cell battery. While the parameters are discussed, other battery parameters are possible depending on application specific needs of the countermeasure.

Some exemplary functions that must be powered by secondary battery 202 before the primary battery 200 is activated include powering the microcontroller 206. The microcontroller 206 is connected to environmental sensors 208 that detect or sense parameters associated with the launch event of the payload 24 being ejected from the platform 1. For example, there may be a shock-sensing device or sensor that can detect or sense the amount of shock experienced by the payload due to the launch thereof. The shock sensor is connected to the microcontroller 206 that is powered by the coin cell secondary battery 202. The shock-sensing device or sensor 208 may comprise one or more accelerometers and g-sensing devices. Sensor 208 is located on the expendable subsystem located distally from the smart piston 90 within the cartridge case or canister 22.

Hold up switch circuit 204 is beneficial inasmuch as coin cell batteries only have a limited amount of energy they can supply. Thus, having all of the sensors 208 always powered on will have a tendency to drain the secondary battery 202 supply quickly. Thus, the system of the present disclosure provides a switching function to enable the secondary battery 202 to be active only when there is a squib 26 inserted in the IC cup 30.

As depicted in FIG. 16A and FIG. 16B, the wires 37 on the IC cup 30 extend from the IC cup 30 to the connector 40 located on the rear side of the smart piston 90. At least one pin (i.e., an electrical pathway) on the smart piston 90 permits a signal to flow through the payload into a control card 210 (FIG. 5B) as discreet wires. The control card 210 carries both coin cell secondary battery 202, microcontroller 206, and the switch circuit 204. The switch circuit 204 includes a field effect (FET) transistor switch 212 that is coupled to the enable input line 214. The enable input line 214 couples with a corresponding pin on the smart piston 90. The enable input line 214 is coupled to the FET switch 212 in a manner such that when the enable input line 214 is tied to ground it will enable the switch 212 to complete a circuit to activate or enable the secondary battery 202. When the squib 26 is not inserted in the IC cup 30, the circuit is not able to connect to ground and therefore the switch 212 coupled to the enable input line 214 is deactivated such that the secondary battery 202 supplies no power to the microcontroller 206 or the sensors 208. Stated otherwise, when the body of squib 26 is inserted into the smart IC cup 30, it enables the circuit to be completed that allows the FET switch 212 to be activated so that the secondary battery 202 can be enabled. Note that the microcontroller 206 has the ability to keep the holdup switch circuit 204 connected (it will do so for a set period of time, for example, 24 hours). This may be advantageous because otherwise launching the countermeasure would cause a break in coin cell battery power during the critical time period where it needs to be measuring the launch shock.

A SSCI (smart squib communication interface) pin on piston 90 is coupled with the circuit card or control card 210 to enable signals to be communicated to the microcontroller 206. Communication signals transmit along the SSCI input allow communication signal to instruct the microcontroller 206 to perform certain operations at a desired time.

As depicted in the diagrammatical flow chart of FIG. 16B, in storage, the secondary battery 202 is deactivated and maintains and stores its potential energy. In this state, the high side switch 212 is open and prevents power from being drawn from the battery 202 because there is no squib inserted into the IC cup 30. The high side switch 212 has a p-channel pass element and an n-channel pulldown. The switch pulls down the gate in response to the squib 26 completing the circuit when it is inserted into the IC cup 30. In one particular embodiment, the switch 212 is a dual p-channel and n-channel switch, which may be preferable for it should cause very low leakage of the secondary battery 202. However, other arrangement of FET transistors that define the switch are entirely possible.

When the squib 26 is inserted into the IC cup 30, the high side switch 212 is turned on so that the conduction path is closed to allow power to travel from the battery 202 through the switch 212 into the microcontroller 206 in order to power the microcontroller. The p-channel gate of switch 212 is tied to the external power supply or a platform power 216 line that is activated when the circuit is completed by tying it to ground. In one embodiment, the P channel gate is tied to the external holdup enable pin. When pulled to ground, the gate-source voltage of the P channel FET transitions through the threshold region and turns on the P channel conduction path. As such, the gate is either floating, tied to ground via a squib, or it can also be pulled to ground via a low-side N channel switch that is controlled by the microcontroller. In one particular embodiment, switch 212 does not interface with platform power, however it may be possible for switch 212 to interface with platform power if necessary to meet an application specific need.

FIG. 16B also depicts that the microcontroller 206 could be powered in a second manner. For example, the microcontroller 206 could be powered by the platform power line 216 that may communicate with the microcontroller over the SSCI input line 214. More particularly, the platform power 216 can be part of the SSCI communication interface that typically operates between three and five volts to maintain the voltage of the communication lower than the voltage required to discharge the squib 26 that is located inside the IC cup 30. In one embodiment, the SSCI is a half-duplex interface. The interface provides, not only communications, but also allows for some power to be harvested. This is a low power interface that typically only supplies about twenty milliamps or less than about one hundred milliwatts. The platform power line 216 is coupled with a regulator 218. In one particular embodiment, the regulator is a linear regulator to regulate the platform power 216 that is in a range from about three volts to about five volts to a lower voltage. In one particular embodiment, the lower voltage regulated by the linear regulator 218 is 2.556 volts. The linear regulator 218 is connected with another high side switch 220. Power is able to be transferred through the linear regulator 218 to the second high side switch 220 to thereby power the microcontroller 206 and communicate with said microcontroller.

One exemplary advantage of the present disclosure is that the system detailed herein does not add any additional steps for an operator, such as a munitions person or an ordinance person during their typical handling of a munitions device. For example, a munitions or ordinance specialist inserts and removes squibs into a cartridge case for an expendable prior to deployment on a platform and subsequent to a completed mission, respectively. Thus, enabling the secondary battery 202 simply by inserting the squib 26 into the IC cup 30 allows the system, and more particularly the battery 202, to remain in an off-state until the system is ready to be installed on a platform at which point the battery 202 will be activated in response to insertion of the squib 26 into the IC cup 30. This greatly prolongs the battery 202 life rather than it always being activated and enabled.

Stated otherwise, the switch 212 is electrically connected to battery 202, wherein the switch 212 is configured to be repeatedly switch the battery 202 between an active state and an inactive state based on two different actions, wherein the active state permits transmission of power from the battery through the switch and the inactive state precludes transmission of power from the battery through the switch. The two different actions include a first action to effect the switch 212 (and thereby the battery 202) to operate in a first manner and a second action to effect the switch 212 (and thereby the battery 202) to operate in a second manner. In this example, the first action effects the switch 212 to permit transmission of power through the switch 212 and the second action effects the switch 212 to preclude transmission of power through the switch 212. In this example, the first action is associated with connecting a device or squib 26 to the IC cup 30 or canister 22 or cartridge case and the second action is associated with the disconnecting the device or squib 26 from the IC cup 30 or canister 22 or cartridge case. The first action completes an electrical current path via connectors 33 contacting squib 26 and the second action is associated with an incomplete electrical current path. The two different actions define a poka-yoke feature of the present disclosure. The poka-yoke feature causes the battery 202 to only be enabled when the squib 26 is inserted in the IC cup and automatically disables the battery 202 when the squib 26 is removed from the IC cup 30. Thus, it is a poka-yoke or fail safe feature that prevents a munitions specialist from accidentally failing to turn off the battery 202 or accidentally failing to turn off the battery. The poka-yoke feature may also be referred to as an error prevention feature. The poka-yoke feature of the present disclosure makes it possible to limit the risks of the secondary battery 202 being accidentally left "on" or enabled when the canister 22 is in storage because the squibs 26 are always removed when the canister 22 is stored. This enables a long shelf life of secondary battery 202 by ensuring that it is disabled when canister 22 is in stored without the squib 26.

The switch 212 allows for usage of the secondary battery 202 when it is necessary during a deployment. The switch deactivates or disables the battery in response to the squib being removed from the IC cup. This is advantageous as it allows the switch to disable the battery when a squib is removed from the IC cup so that the expendable can be stored. The expendable can be reused for a later mission as necessary by simply reinstalling another squib in the IC cup to reactivate or re-enable the battery 202. When the expendable is at rest without a squib in the IC cup, the switch 212 is off so the battery does not (or very minimally) drain. There is low leakage (<500 nA) that minimizes impact to battery 202 capacity.

When the squib 26 blows (as shown in FIG. 15B) and the system desires to continue to power the microcontroller 206 with the secondary battery 202, the microcontroller 206 will have control of the high side switch 212. The control that the squib 26 exerts will bypass the high side switch 26, but if the squib is removed or blown, then the microcontroller 206 can use a positive voltage on the n-channel portion of the high side switch 212 to continue to keep its power supply enabled. Thus, the microcontroller 206 will be powered up when the squib 26 is inserted into IC cup 30 and then the microcontroller 206 will turn on the high side switch 212 via the n-channel so that microcontroller 206 can continue to be powered after the squib 26 is blown and subsequently removed due to discharge.

To ensure that the microcontroller 206 does not hold the secondary battery 202 on or in an enabled-state indefinitely, the microcontroller performs a maintenance action once every set or prescribed amount of time, such as twenty-four hours. In this set time period, the microcontroller will attempt to turn off the switch 212 via the n-channel. If the microcontroller 206 remains powered when microcontroller 206 tries to turn off the battery 202 and the squib is still installed, then the microcontroller 206 will renew its prescribed time period that it is continuing to hold that switch 212 on.

The configuration of the system of the present disclosure supports the preservation of secondary battery 202 capacity. The system utilizes the IC cup 30 in conjunction with an electrical pathway into the subassembly (the expendable payload 24 located distally from the smart piston 90) to allow for external switching of the battery 202. The IC cup 30 is designed to implement shunt and enable switching functionality when a squib 26 or other energetic material is inserted. One advantage of the system of the present disclosure is that the enable/disable of the battery 202 requires no additional maintenance of the expendable or canister 22. Further, the switch 212 is operative with both smart squibs and conventional non-smart squibs.

When the switch 212 activates or enables the battery 202 in response to the squib 26 being inserted into the IC cup 30, the sensors 208, such as accelerometers and G switches, are put into standby mode and ready to take a measurement. Other sensors 208 may additionally include one or more sensors to sense or gather data pertaining to the surrounding environment or operation of the expendable. Some exemplary sensors capable of being electronically coupled with or carried by the expendable may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

Having now described the components of a countermeasure expendable of the set of countermeasure expendables 20, a method of testing at least one countermeasure expendable of the set of countermeasure expendables 20 in a testing operation is discussed in greater detail below.

Figure 12:
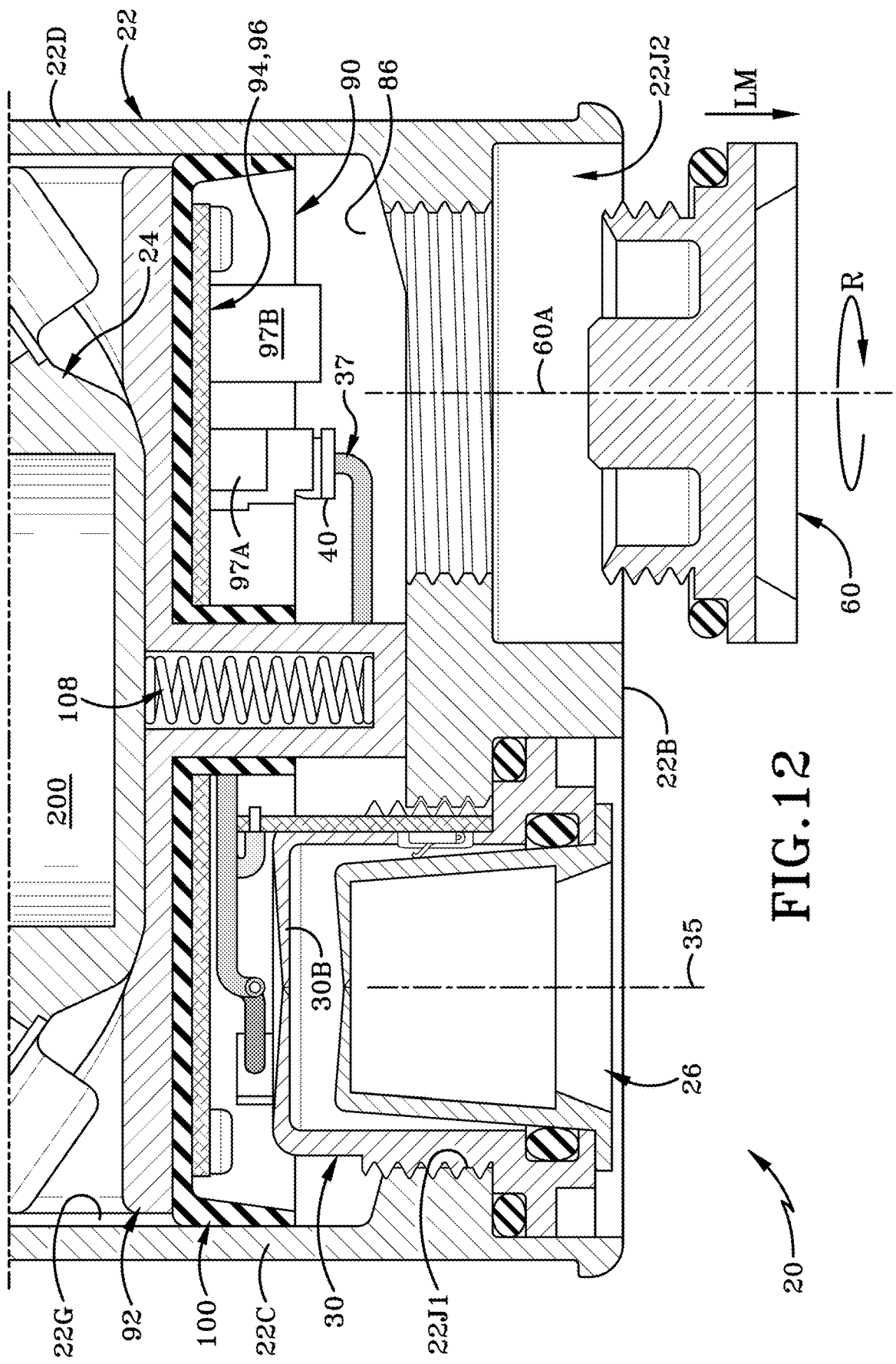
FIG. 12 (FIG. 12) is an operational view of the countermeasure expendable, wherein a port plug of the countermeasure expendable is removed from the canister of the countermeasure expendable.

Prior to testing at least one countermeasure expendable of the set of countermeasure expendables 20, an operator must remove the port plug 60 from the canister 22. As best seen in FIG. 12, the operator may use a tool to threadably disengage the port plug 60 from the second threaded opening 22J2 by loosening the port plug 60 from the second threaded opening 22J2 about the rotational axis 60A from the second threaded opening 22J2 is denoted by an arrow labeled "R" in FIG. 12. Once loosened, the operator may then remove and linearly move the port plug 60 from the canister 22; such removal of the port plug 60 is denoted by an arrow labeled "LM" in FIG. 12.

Figure 13:
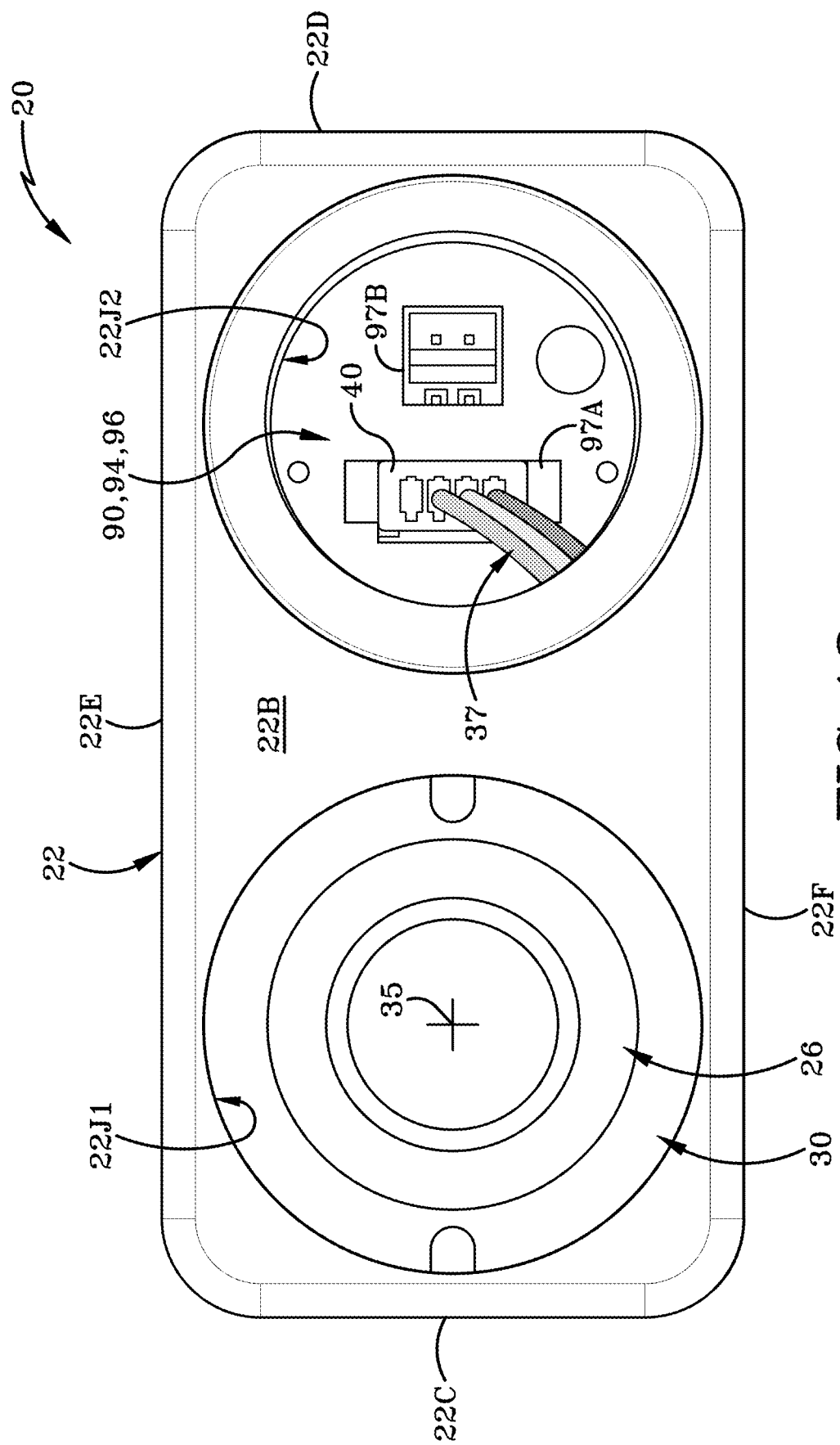
FIG. 13 (FIG. 13) is a rear elevation view of the countermeasure expendable, wherein the port plug is removed from the canister.
Figure 14:
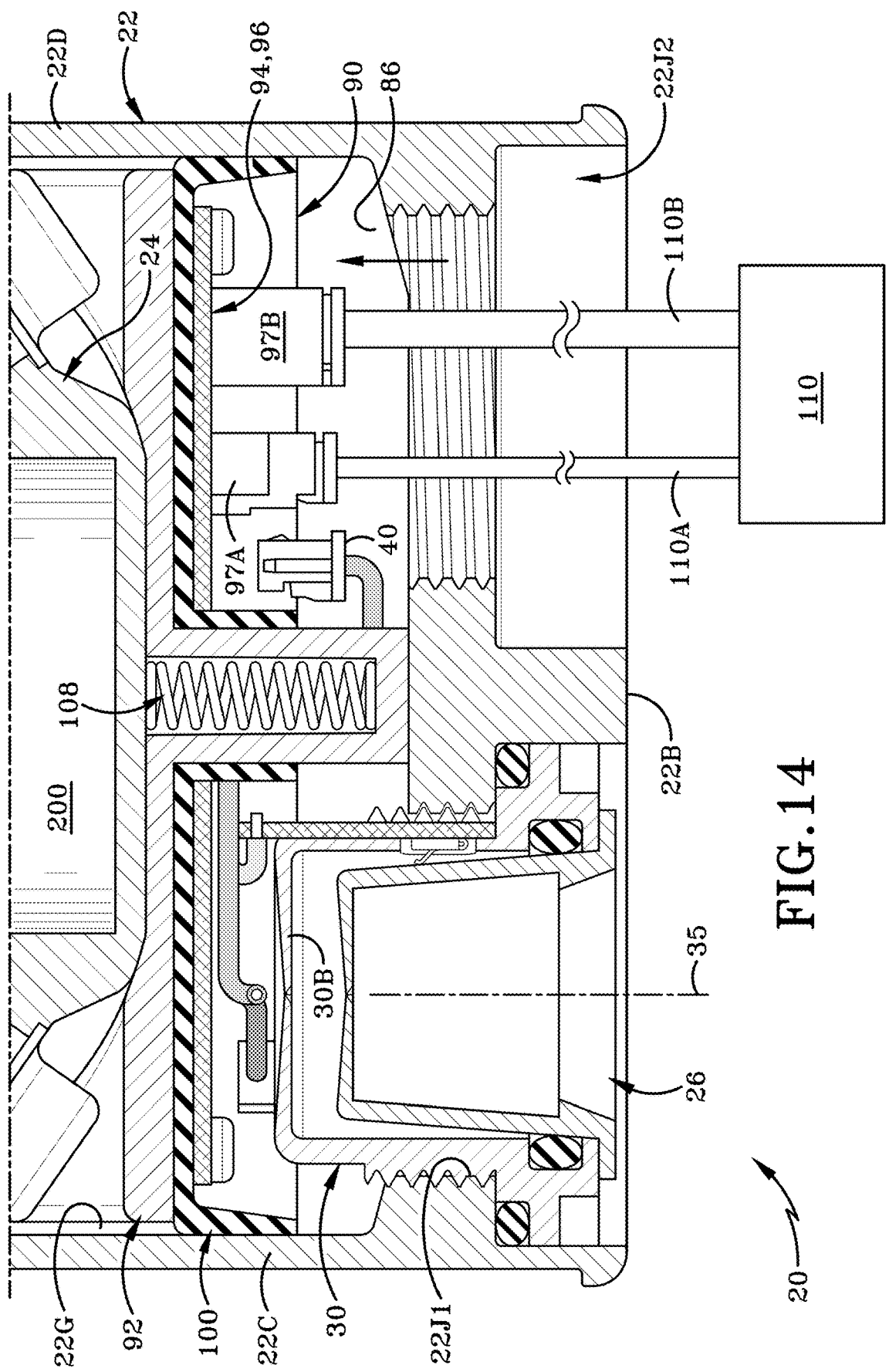
FIG. 14 (FIG. 14) is another operational view similar to FIG. 12, but an external computer is electrically connected with a processing unit of a payload of the countermeasure expendable via the smart piston.
Figure 15A:
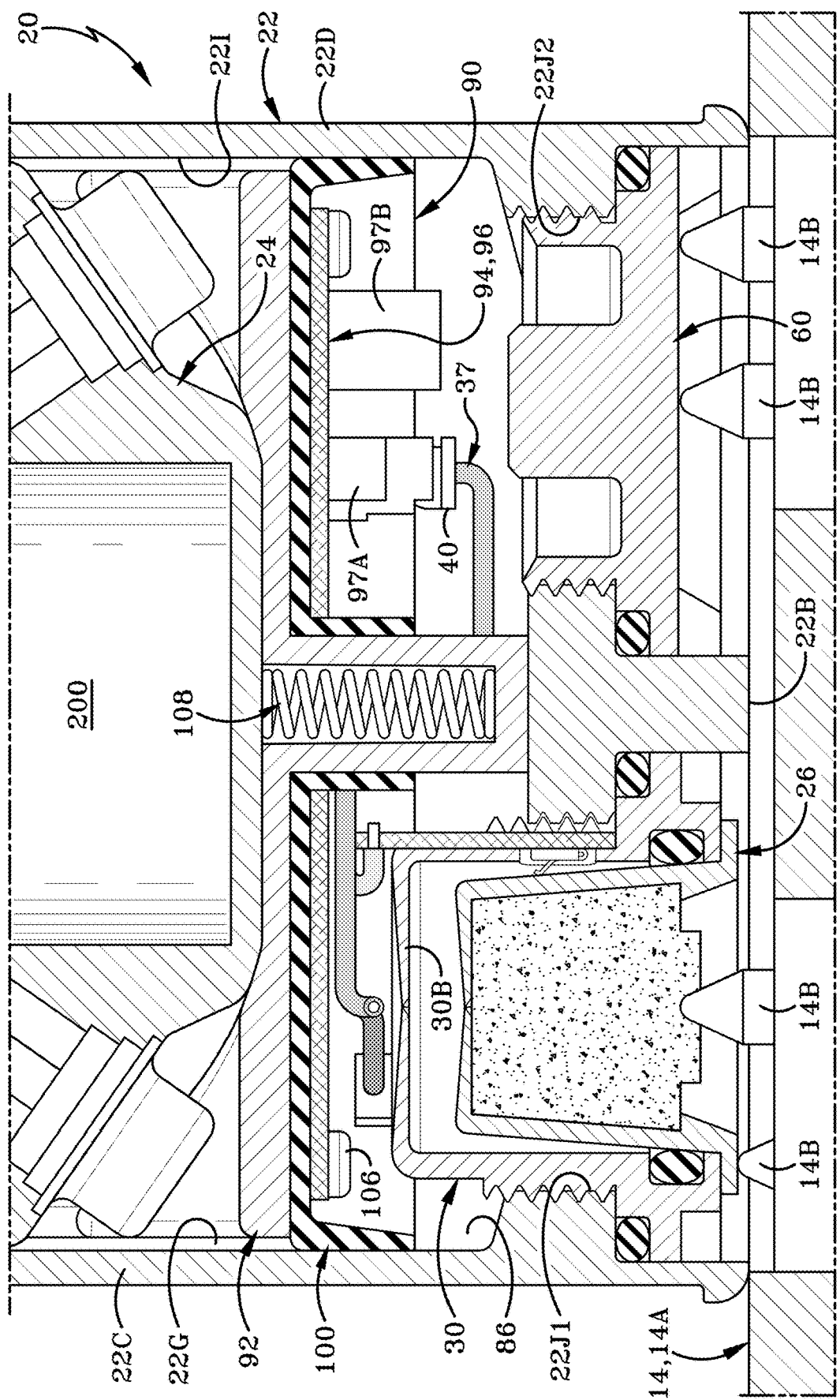
FIG. 15A (FIG. 15A) is an operational view of the countermeasure expendable, wherein the countermeasure expendable is loaded into a magazine of the CMDS and engages with a pair of firing pin mechanisms of a breech-plate assembly of the CMDS.
Figure 15B:
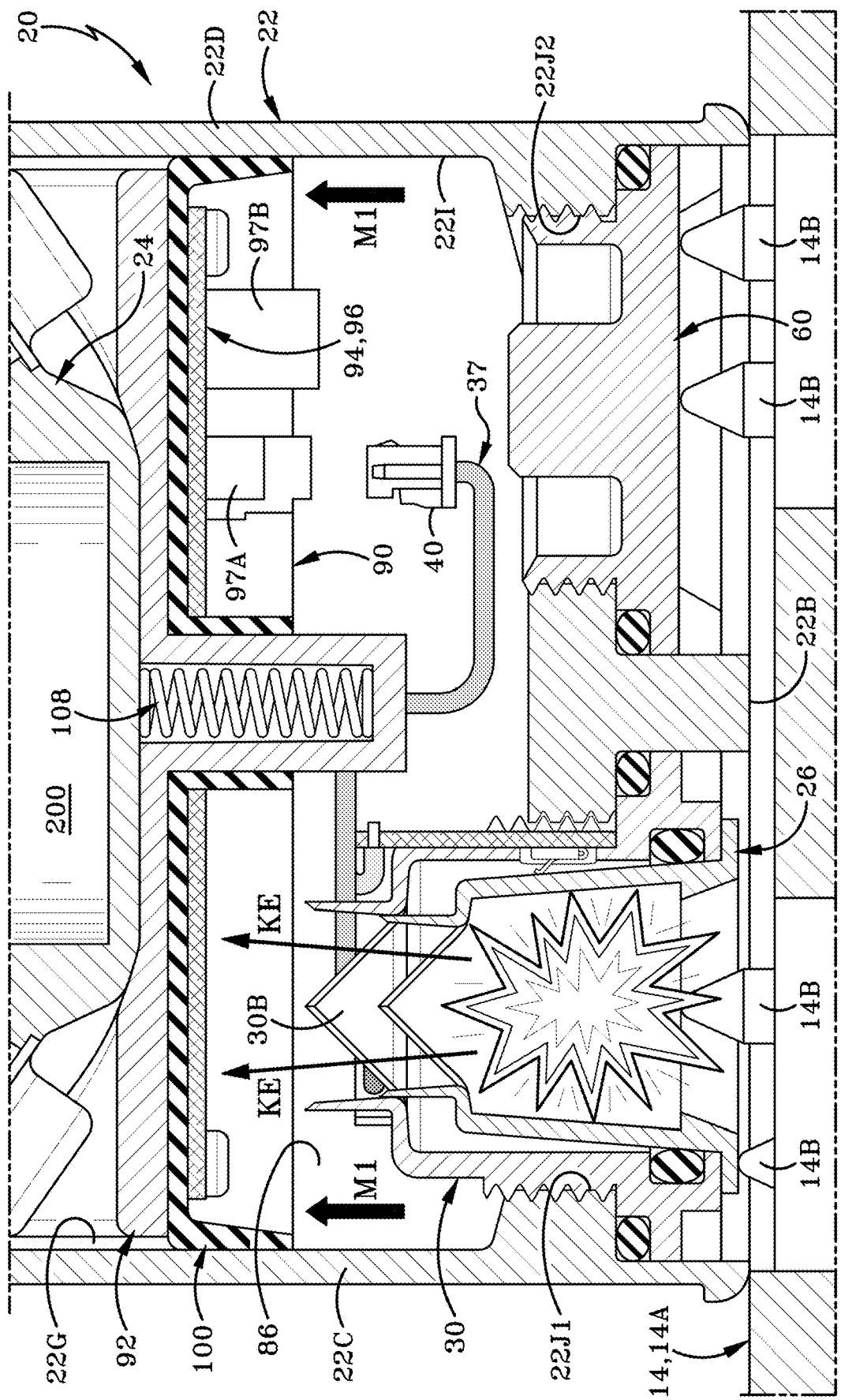
FIG. 15B (FIG. 15B) is another operational view similar to FIG. 15A, but a squib of the countermeasure expendable ignites and generates kinetic energy to eject the payload and the smart piston from the canister.
Figure 15C:
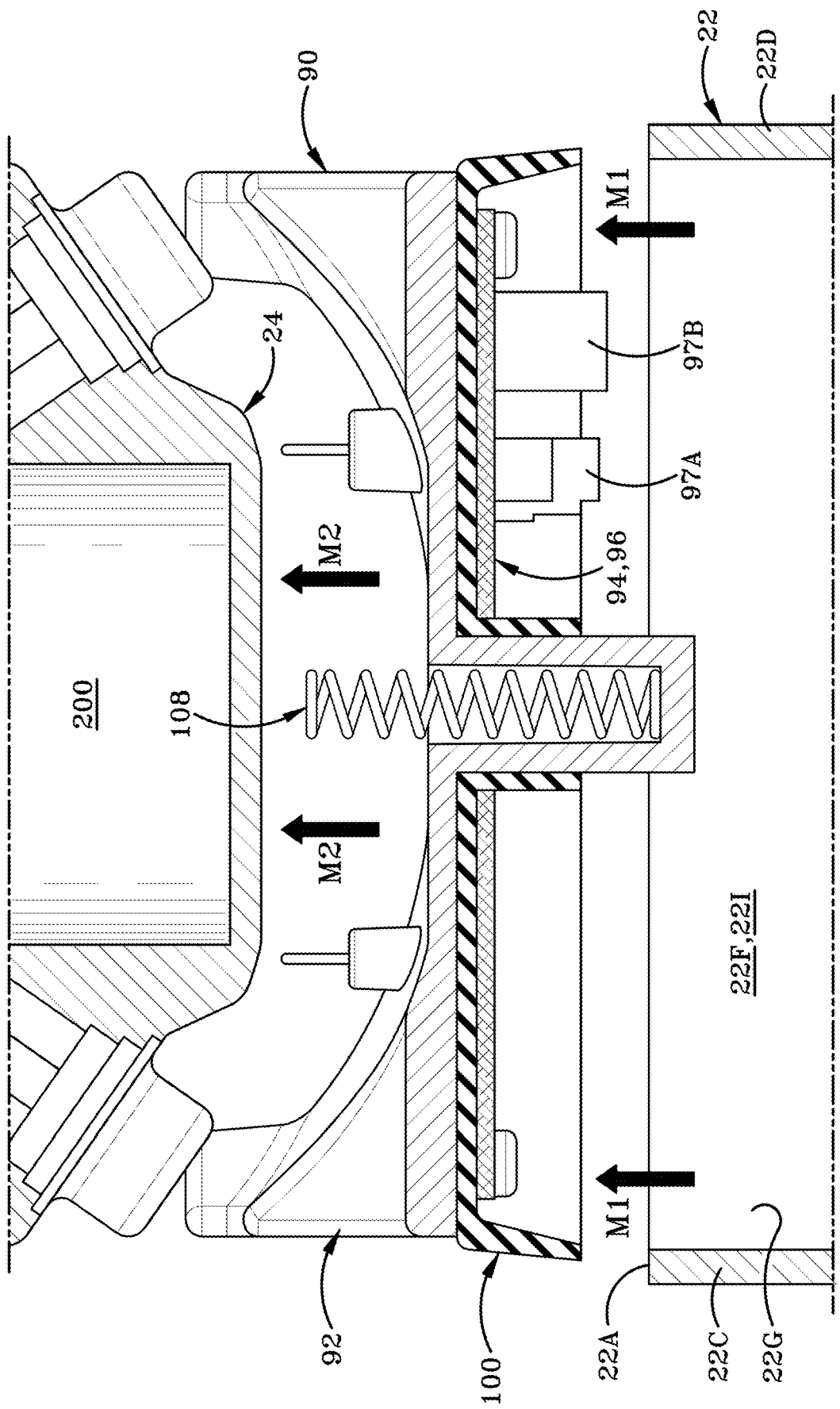
FIG. 15C (FIG. 15C) is another operational view similar to FIG. 15B, but a spring of the smart piston bias the payload outwardly from the platform when the payload and the smart piston are external to the canister.

FIG. 13-14 depict that once plug 60 is removed, the operator may then introduce and connect an external testing unit or computer 110 with the smart piston 90. More particularly, the operator may introduce a connecting wire 110A of the external testing unit 110 through the second threaded opening 22J2 and connect the connecting wire 110A with the second electrical port 97B. Once connected, the operator may then interface with the processing unit of the payload 24 and other various parts and components electrically connected with the electronic system 94, including the impulse cartridge cup 30. Such interfacing with the payload 24 may enable the operator to perform various operations and/or tasks on the payload 24 in a testing environment. Note that the depicted connection between computer 110 and port 97B via wire 110A is a power supply interface. The external computer 110 is connected to the countermeasure expendable via a test squib (installed at squib 26) where communication will take place. This particular interface can be exercised in a test environment but power and communication will all be handled through the squib in a real life use case. Port 97B is only a power input for running higher power functions in the system (power is connected to the functions that primary battery 200 is used). The processing and computer connection can either be implemented through the smart squib (or an inert smart squib designed to interface with the IC cup), or the four-pin connector 40 that can be removed from port 97A, and the computer can be directly connected to 97A instead. In a test environment it would be desirable to use the inert squib approach so that the IC Cup pathways can be verified to function properly.

Having now described the components of a countermeasure expendable of the set of countermeasure expendables 20, a method of firing at least one countermeasure expendable of the set of countermeasure expendables 20 from the platform 1 is discussed in greater detail below.

Prior to a military operation with platform 1, an operator of the CMDS 10 may begin to load the breechplate assembly 14 and the magazine assembly 16 into dispenser 12A of dispenser assembly 12. First, the operator may initially load the breechplate assembly 14 into dispenser 12A of dispenser assembly 12. Once inside of the dispenser 12A, the operator may then operably engage then electrically connect the breechplate assembly 14 with the dispenser assembly 12. In this step, a controller assembly (if included) may also be electrically connected with the dispenser assembly 12. Such connection between the dispenser assembly 12 and the breechplate assembly 14 enables the breechplate assembly 14 to communicate with sequencer 16 provided on the platform 1 via the wiring harness 12B of dispensing assembly 12.

Prior to loading the magazine assembly 16 into the dispenser 12A of the dispenser assembly 12, the magazine 16A is loaded with the set of countermeasure expendables 20. Here, an operator of the CMDS 10 loads each countermeasure expendable of the set of countermeasure expendables 20 into a rear set of apertures defined in the magazine 16A until each countermeasure expendable of the set of countermeasure expendables 20 is fully housed inside of a respective passageway of a set of passageways defined in the magazine 16. It should be noted that additional retaining plates and/or members may be attached to the magazine 16 to keep each countermeasure expendable of the set of countermeasure expendables 20 inside of the magazine 16A.

In operation, a squib 26 is inserted through the opening at the first end and into the cavity 30A of IC cup 30. The squib 26 is moved rearward toward the second end or endwall 30B of the body of the IC cup 30. The squib 26 is formed from a conductive material. When the squib 26 is inserted into the cavity 30A, the exterior surface of squib 26 will contact at least one of the three electrical connectors 33A-33C. In one embodiment, the exterior surface of the contacts all three electrical connectors 33A-33C simultaneously. When at least two of three connectors, such as second connector 33B and third connector 33C are contacted by the squib 26, the conductive material of the squib 26 enables a circuit to be completed between the second connector 33B and the third connector 33C. When the connectors 33A-33C are formed as bowlegged spring connectors, the tab portion on the connectors 33A-33C are biased into a contacting relationship with the exterior surface of squib 26 to ensure that the connection remains a completed circuit during the operation or deployment of the expendable.

When a circuit is completed by the electrical connection of the second connector 33B and the third connector 33C, the first connector 33A is enabled to send signal through the first wire 37A to the common connector 40 and ultimately into the payload 24. The signals sent through first connector 33A can be utilized to reprogram corresponding circuits or processors on the payload 24 or can be used as a hold up signal for the coin cell secondary battery 202.

During a military operation, sequencer 18 may send at least one electrical signal to the breechplate assembly 14 to fire and eject at least one countermeasure expendable from the set of countermeasure expendables 20 to perform a countermeasure operation. The sequencer 18 sends at least one electrical signal to the breechplate assembly 14, particularly at least one firing pin from the set of firing pin mechanisms 14B, to ignite squib 26. Upon ignition, the squib 26 creates kinetic energy "KE" that is directed through the impulse cartridge cup 30 and towards the smart piston 90 into a combustion chamber 86 defined between the impulse cartridge cup 30 and the smart piston 90. The kinetic energy is also maintained between the impulse cartridge cup 30 and the smart piston 90 to ensure that a substantial amount of the kinetic energy is used to eject the payload 24 and the smart piston 90 from the canister 22. The kinetic energy generated by the squib 26 then collectively moves the payload 24 and the smart piston 90 through the canister 22 towards the front wall 22A away from the rear wall 22B, as indicated by arrows M1. There is a first electrical port 97A that electrically connects with an electronic circuit board (ECB) on piston 90. First electrical port 97A enables a set of electrical connections to electrically connect the impulse cartridge cup 30 with the electronic system 94. Such first electrical port 97A enables the impulse cartridge cup 30 and the payload 24 to logically communicate with one another by passing through the smart piston 90. A second electrical port 97B electrically connects with the ECB. Second electrical port 97B enables an external computer or testing unit to electrically connect with electronic system 94 for testing purposes that are at high power levels to simulate power from the primary battery 200. Such second electrical port 97B enables a user of countermeasure expendable 20 to communicate and interface with the processing unit of the payload 24 for various testing operations. The common connector 40 is disconnected from its connection with port 97A in response to the detonation of squib 26.

Once the payload 24 and the smart piston 90 are positioned outside of the canister 22, a biaser 108 will bias the payload 24 outwardly away from the smart piston 90, as evidenced by arrow M2. Such biasing by the biaser 108 pushes the payload 24 further away from the platform 1 to overcome external environment factors surrounding the platform 1, such as external wind gusts, lack of gravity applied against payload 24 (i.e., ejected when platform 1 is inverted), and other various external environment factors. It should be noted that the kinetic energy generated by the squib 26 may also be a suitable amount of energy for ejecting the payload 24 away from the platform 1 in addition to the biasing force applied by the biaser.

The device, assembly, or system of the present disclosure may additionally include one or more sensor to sense or gather data pertaining to the surrounding environment or operation of the device, assembly, or system. Some exemplary sensors capable of being electronically coupled with the device, assembly, or system of the present disclosure (either directly connected to the device, assembly, or system of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

The device, assembly, or system of the present disclosure may include wireless communication logic coupled to sensors on the device, assembly, or system. The sensors gather data and provide the data to the wireless communication logic. Then, the wireless communication logic may transmit the data gathered from the sensors to a remote device. Thus, the wireless communication logic may be part of a broader communication system, in which one or several devices, assemblies, or systems of the present disclosure may be networked together to report alerts and, more generally, to be accessed and controlled remotely. Depending on the types of transceivers installed in the device, assembly, or system of the present disclosure, the system may use a variety of protocols (e.g., Wifi, ZigBee, MiWi, Bluetooth) for communication. In one example, each of the devices, assemblies, or systems of the present disclosure may have its own IP address and may communicate directly with a router or gateway. This would typically be the case if the communication protocol is WiFi.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A countermeasure device comprising:
a canister;
a deployable payload within the canister, where the deployable payload is adapted to be deployed from the canister;
a battery in the canister; and
a switch in the canister that is electrically connected to the battery, wherein the switch is configured to be repeatedly switched between an active state and an inactive state based on two different interactions with the canister, wherein the active state permits transmission of power from the battery through the switch and the inactive state precludes transmission of power from the battery through the switch;
wherein the two different interactions with the canister includes:
a first action relative to a portion of the canister to effect the switch to operate in a first manner; and a second action relative to the portion of the canister to effect the switch to operate in a second manner;

wherein the first action effects the switch to permit transmission of power through the switch and the second action effects the switch to preclude transmission of power through the switch; and wherein the first action is associated with connecting a device to the canister and the second action is associated with the disconnecting the device from the canister.

2. The countermeasure device of claim 1, wherein the first action is associated with connecting an impulse cartridge or squib as said device to an end of the canister and the second action is associated with disconnecting the impulse cartridge or squib from the canister.

3. The countermeasure device of claim 1, further comprising:

an impulse cartridge (IC) cup on the canister, wherein insertion of an impulse cartridge or squib as said device into the IC cup establishes a completed electrical current path associated with the first action to permit transmission of power through the switch.

4. The countermeasure device of claim 3, wherein removal of the impulse cartridge or squib from the IC cup results in an incomplete electrical current path associated with the second action to preclude transmission of power through the switch.

5. The countermeasure device of claim 1, further comprising:

an impulse cartridge (IC) cup on the canister, wherein removal of an impulse cartridge or squib as said device from the IC cup results in an incomplete electrical current path associated with the second action that limits transmission of power through the switch.

6. A countermeasure device comprising:

a cartridge case;

an impulse cartridge (IC) cup on the cartridge case;

a deployable payload within the cartridge case, where the deployable payload is adapted to be deployed and expelled from the cartridge case; and a battery on the deployable payload, wherein the battery is enabled to power a component on the deployable payload in response to an impulse cartridge being connected with the IC cup and the battery is disabled in response to the impulse cartridge being disconnected from the IC cup.

7. The countermeasure device of claim 6, further comprising:

a microcontroller on the deployable payload, wherein the microcontroller is in electrical communication with the battery; and wherein the microcontroller is the component that is powered by the battery when the impulse cartridge is connected with the IC cup and the microcontroller is not powered by the battery for a period of time after the impulse cartridge has been disconnected from the IC cup.

8. The countermeasure device of claim 6, further comprising:

an active mode of the battery associated with powering the component on the deployable payload when the impulse cartridge is connected to the IC cup; and an inactive mode of the battery associated with not powering the component on the deployable payload when the impulse cartridge is disconnected from the IC cup.

9. The countermeasure device of claim 6, further comprising:

a switch within the cartridge case, wherein the switch permits transmission of power from the battery to the component in response to impulse cartridge being connected with the IC cup and the switch precludes transmission of power from the battery to the component in response to the impulse cartridge being disconnected from the IC cup.

10. The countermeasure device of claim 9, wherein the switch is a field-effect transistor (FET).

11. The countermeasure device of claim 10, further comprising:

a control card on the deployable payload, wherein the FET is located on the control card.

12. The countermeasure device of claim 11, wherein the battery is on the control card.

13. The countermeasure device of claim 12, further comprising:

a microcontroller on the control card, wherein the microcontroller is in electrical communication with the battery on the control card, and wherein the microcontroller is the component powered by the battery when the impulse cartridge is connected with the IC cup and the microcontroller is not powered by the battery for a period of time after the impulse cartridge has been disconnected from the IC cup.

14. The countermeasure device of claim 13, further comprising:

a sensor within the cartridge case, wherein the sensor is electrically coupled to the microcontroller, and wherein the sensor is installed on the control card.

15. A method comprising:

supplying a countermeasure device to an individual or entity, wherein the countermeasure device includes a canister and a deployable payload within the canister, wherein the deployable payload is adapted to be deployed and expelled from the canister and there is a battery on the deployable payload, wherein the battery is enabled to power a component on the deployable payload in response to an impulse cartridge or squib being connected with the an impulse cartridge (IC) cup on the cannister and the battery is disabled in response to the impulse cartridge being disconnected from the IC cup;

effecting the individual or entity to insert an impulse cartridge or squib into an impulse cartridge cup (IC cup) on the canister;

effecting the individual or entity to enable a battery on the deployable payload to enter an active power mode in response to the impulse cartridge or squib being inserted into the IC cup;

effecting the individual or entity to remove the impulse cartridge or squib from the IC cup; and effecting the individual or entity to disable the battery on the deployable payload such that the battery enters an inactive state in response to the impulse cartridge or squib being removed from the IC cup.

* * * * *